(12) United States Patent
Kimchi et al.

(10) Patent No.: US 11,440,671 B2
(45) Date of Patent: Sep. 13, 2022

(54) ADJUSTABLE MOTOR FAIRINGS FOR AERIAL VEHICLES

(71) Applicant: Amazon Technologies, Inc., Seattle, WA (US)

(72) Inventors: Gur Kimchi, Seattle, WA (US); Louis LeGrand, III, Seattle, WA (US); Shmuel Eisenmann, Seattle, WA (US); Dominic Shiosaki, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 706 days.

(21) Appl. No.: 16/256,279

(22) Filed: Jan. 24, 2019

(65) Prior Publication Data
US 2020/0239150 A1 Jul. 30, 2020

(51) Int. Cl.
*B64D 29/06* (2006.01)
*B64C 39/02* (2006.01)
*B64C 39/06* (2006.01)

(52) U.S. Cl.
CPC ............ *B64D 29/06* (2013.01); *B64C 39/024* (2013.01); *B64C 39/062* (2013.01);
(Continued)

(58) Field of Classification Search
CPC ..... B64C 39/024; B64C 39/062; B64C 23/06; B64C 23/00; B64C 23/02; B64C 9/034; B64C 9/036; B64C 2201/086; B64C 2201/104; B64C 2201/165; B64C 29/0016; B64C 29/0033; B64C 29/0075;
(Continued)

(56) References Cited

U.S. PATENT DOCUMENTS 2,403,353 A * 7/1946 Ernest ................ B64C 29/0033
244/56
2,651,172 A * 9/1953 Kennedy .................. F02K 1/06
239/127.3
(Continued)

FOREIGN PATENT DOCUMENTS

EP 3263456 A1 1/2018

OTHER PUBLICATIONS

International Search Report for International Application No. PCT/US2020/014015, dated May 12, 2020.

*Primary Examiner* — Medhat Badawi
(74) *Attorney, Agent, or Firm* — Athorus, PLLC

(57) ABSTRACT

Systems and methods to reduce aerodynamic drag and/or affect flight characteristics of an aerial vehicle may include adjustable fairings associated with one or more components of the aerial vehicle. The adjustable fairings may be coupled to and at least partially surround a motor, propulsion mechanism, motor arm, strut, or other component of an aerial vehicle. In addition, the adjustable fairings may be passively movable between two or more positions responsive to airflow around the fairings, and/or the adjustable fairings may be actively moved between two more positions to affect flight characteristics. Further, the adjustable fairings may include actuatable elements to alter a portion of an outer surface of the fairings to thereby affect flight characteristics. In this manner, adjustable fairings associated with various components of an aerial vehicle may reduce aerodynamic drag and/or may improve control and safety of an aerial vehicle.

20 Claims, 10 Drawing Sheets

(52) U.S. Cl.
CPC .. *B64C 2201/086* (2013.01); *B64C 2201/104* (2013.01); *B64C 2201/165* (2013.01)

(58) Field of Classification Search
CPC ........ B64C 2201/027; B64C 2201/042; B64C 2201/08; B64D 29/06; Y02T 50/60
See application file for complete search history.

(56) References Cited

U.S. PATENT DOCUMENTS

| | | | | | |
|---|---|---|---|---|---|
| 3,254,725 | A * | 6/1966 | Higgins | ............. | B64C 29/0033 416/149 |
| 3,744,745 | A * | 7/1973 | Kerker | ................... | B64C 23/06 244/199.1 |
| 3,957,230 | A * | 5/1976 | Boucher | ............... | B64D 33/08 244/53 R |
| 4,093,122 | A * | 6/1978 | Linderman | ............... | F02K 1/11 239/127.3 |
| 4,789,115 | A * | 12/1988 | Koutsoupidis | ........... | B64C 27/26 244/215 |
| 4,979,698 | A * | 12/1990 | Lederman | ........... | B64C 29/0033 244/17.13 |
| 5,031,858 | A * | 7/1991 | Schellhase | ............. | B64C 27/50 244/7 R |
| 5,419,514 | A * | 5/1995 | Ducan | ................. | B64C 29/0033 244/12.4 |
| 5,598,990 | A * | 2/1997 | Farokhi | .................. | B64C 23/06 244/200.1 |
| 5,634,613 | A * | 6/1997 | McCarthy | ............ | B64C 23/069 244/199.1 |
| 5,771,681 | A * | 6/1998 | Rudolph | ................ | F02K 1/383 239/265.37 |
| 6,179,225 | B1 * | 1/2001 | Bouiller | ................... | F02K 1/11 239/265.17 |
| 6,318,070 | B1 * | 11/2001 | Rey | ..................... | F02K 1/1207 60/226.3 |
| 6,487,848 | B2 * | 12/2002 | Zysman | ................ | B64D 33/06 239/265.19 |
| 6,532,729 | B2 * | 3/2003 | Martens | ................. | F02K 1/386 181/206 |
| 6,718,752 | B2 * | 4/2004 | Nesbitt | .................... | F02K 1/46 60/204 |
| 6,719,244 | B1 * | 4/2004 | Gress | ................. | B64C 29/0033 244/17.25 |
| 7,055,329 | B2 * | 6/2006 | Martens | ................. | F02K 1/38 60/772 |
| 7,226,015 | B1 * | 6/2007 | Prince | ..................... | F41G 7/00 244/3.21 |
| 7,340,883 | B2 * | 3/2008 | Wood | .................... | F02K 1/386 60/226.1 |
| 7,578,132 | B2 * | 8/2009 | Webster | ................... | F02K 1/42 60/770 |
| 7,870,722 | B2 * | 1/2011 | Birch | ...................... | F02K 1/30 60/226.1 |
| 7,883,049 | B2 * | 2/2011 | Nesbitt | .................... | F02K 1/44 244/1 N |
| 7,963,099 | B2 * | 6/2011 | Renggli | ................. | F02K 1/386 60/262 |
| 7,966,824 | B2 * | 6/2011 | Mengle | ................. | B64D 33/04 60/770 |
| 7,966,826 | B2 * | 6/2011 | Alkislar | ................. | F02K 1/386 60/770 |
| 7,966,827 | B2 * | 6/2011 | Alletzhauser | ............. | F02K 1/16 60/770 |
| 8,087,617 | B2 * | 1/2012 | Sclafani | ................. | B64C 7/02 244/204.1 |
| 8,157,207 | B2 * | 4/2012 | Mengle | ................. | F02K 1/386 244/53 R |
| 8,245,516 | B2 * | 8/2012 | Song | ........................ | F02K 1/06 60/771 |
| 8,375,699 | B1 * | 2/2013 | Atassi | ..................... | F02K 1/06 60/226.3 |
| 8,393,435 | B2 * | 3/2013 | Guerin | ..................... | F02K 1/46 181/215 |
| 8,549,834 | B2 * | 10/2013 | Do | ......................... | F02K 1/383 60/226.3 |
| 8,584,442 | B2 * | 11/2013 | Webster | ................... | F02K 1/48 60/204 |
| 8,613,398 | B2 * | 12/2013 | Calder | ..................... | F02K 1/383 239/265.19 |
| 8,651,142 | B2 * | 2/2014 | Sellers | ................... | F03G 7/065 138/45 |
| 8,864,071 | B2 * | 10/2014 | Vergnaud | ................ | B60N 2/34 244/118.6 |
| 9,199,733 | B2 * | 12/2015 | Keennon | ................. | B64C 11/20 |
| 9,376,208 | B1 * | 6/2016 | Gentry | ................... | G08G 5/006 |
| 9,429,071 | B2 * | 8/2016 | Quackenbush | ........... | F02C 7/04 |
| 9,469,394 | B2 * | 10/2016 | Vaughn | ................... | B64C 17/02 |
| 9,638,176 | B2 * | 5/2017 | Shivashankara | ........ | B64C 23/06 |
| 9,789,956 | B2 * | 10/2017 | Bordoley | ................ | B64C 13/02 |
| 9,963,228 | B2 * | 5/2018 | McCullough | ............ | B64C 1/32 |
| 9,989,009 | B2 * | 6/2018 | Bakken | ................... | F02K 1/805 |
| 10,011,351 | B2 * | 7/2018 | McCullough | ........... | B64D 1/22 |
| 10,029,785 | B2 * | 7/2018 | Niedzballa | ............. | B64D 27/02 |
| 10,183,746 | B2 * | 1/2019 | McCullough | ....... | B64C 29/0033 |
| 10,214,285 | B2 * | 2/2019 | McCullough | ......... | B64C 29/02 |
| 10,315,761 | B2 * | 6/2019 | McCullough | ......... | B64C 29/02 |
| 10,329,014 | B2 * | 6/2019 | McCullough | ........... | B64C 39/08 |
| 10,364,024 | B2 * | 7/2019 | Tighe | ................... | G05D 1/0858 |
| 10,468,545 | B1 * | 11/2019 | Yang | ........................ | B64C 3/48 |
| 10,472,061 | B2 * | 11/2019 | Lee | ...................... | B64C 39/024 |
| 10,723,445 | B2 * | 7/2020 | Binks | ..................... | B64C 23/06 |
| 10,858,089 | B2 * | 12/2020 | Bays-Muchmore | ... | B64D 29/02 |
| 10,988,248 | B2 * | 4/2021 | Miki | ......................... | B64C 7/00 |
| 11,066,159 | B2 * | 7/2021 | Karem | .................... | B64C 13/18 |
| 11,077,937 | B1 * | 8/2021 | Bruell | ..................... | B64C 27/28 |
| 11,104,446 | B2 * | 8/2021 | McCullough | ........ | G05D 1/0077 |
| 11,130,568 | B2 * | 9/2021 | Morris | ................. | B64C 29/0033 |
| 11,148,798 | B2 * | 10/2021 | Gilliland | ................. | B64C 3/56 |
| 11,149,637 | B2 * | 10/2021 | Todorovic | ............. | B64D 29/06 |
| 2002/0125340 | A1 * | 9/2002 | Birch | ........................ | F02K 1/46 239/265.11 |
| 2003/0094537 | A1 * | 5/2003 | Austen-Brown | ... | B64C 29/0033 244/7 R |
| 2008/0149758 | A1 * | 6/2008 | Colgren | ................ | B64C 39/024 244/13 |
| 2009/0261198 | A1 * | 10/2009 | Bon | ........................ | B64C 7/00 244/54 |
| 2010/0038492 | A1 * | 2/2010 | Sclafani | ................. | B64C 23/06 244/199.1 |
| 2010/0176249 | A1 * | 7/2010 | Schwetzler | ............... | B64C 7/02 244/199.1 |
| 2010/0301168 | A1 * | 12/2010 | Raposo | ................... | A63H 23/00 244/171.2 |
| 2011/0001020 | A1 * | 1/2011 | Forgac | ................... | B64C 39/024 244/7 A |
| 2012/0073262 | A1 * | 3/2012 | Bulin | ..................... | B64D 29/00 60/226.2 |
| 2012/0292456 | A1 * | 11/2012 | Hollimon | ................ | B64C 27/28 244/7 A |
| 2014/0138477 | A1 * | 5/2014 | Keennon | ................. | B64C 39/02 244/17.23 |
| 2014/0175214 | A1 * | 6/2014 | Lundgren | .............. | B64D 47/08 244/17.23 |
| 2015/0110619 | A1 * | 4/2015 | Bulin | ..................... | B64D 29/06 415/213.1 |
| 2015/0136897 | A1 * | 5/2015 | Seibel | ................. | B64C 29/0033 244/6 |
| 2016/0052621 | A1 * | 2/2016 | Ireland | ................... | F04D 29/684 137/13 |
| 2016/0340024 | A1 * | 11/2016 | Pautis | .................... | B64D 29/08 |
| 2017/0057647 | A1 * | 3/2017 | Evulet | .................... | B64C 23/00 |
| 2017/0313432 | A1 * | 11/2017 | Boileau | ................. | B64D 29/06 |
| 2017/0321633 | A1 * | 11/2017 | Boileau | ................. | B64D 29/06 |
| 2018/0002026 | A1 * | 1/2018 | Oldroyd | ............. | B64C 29/0033 |
| 2018/0283276 | A1 * | 10/2018 | Todorovic | ............. | B64D 33/02 |
| 2018/0334240 | A1 * | 11/2018 | Paulson | ................... | B64C 7/00 |
| 2019/0048824 | A1 * | 2/2019 | Calder | .................... | F02K 1/763 |
| 2019/0170088 | A1 * | 6/2019 | Gonidec | ................. | F02K 1/70 |

(56) References Cited

U.S. PATENT DOCUMENTS

| | | | |
|---|---|---|---|
| 2019/0202503 A1* | 7/2019 | Suk | B64C 11/18 |
| 2019/0293022 A1* | 9/2019 | Mickelsen | B64D 29/06 |
| 2020/0001973 A1* | 1/2020 | Bushmire | B64C 29/0033 |
| 2020/0031485 A1* | 1/2020 | Kerbler | B64D 45/0005 |
| 2020/0239150 A1* | 7/2020 | Kimchi | B64D 29/06 |
| 2020/0324875 A1* | 10/2020 | Besse | B64C 11/001 |
| 2021/0031909 A1* | 2/2021 | Pachidis | B64C 39/12 |

* cited by examiner

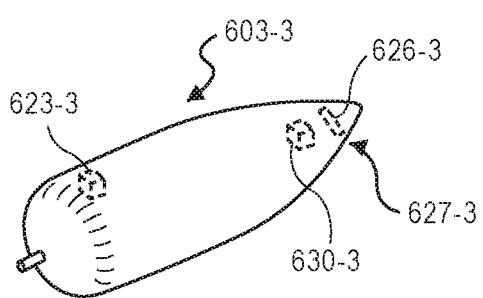
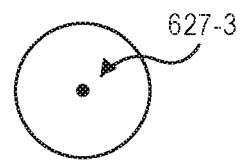
FIG. 6I    FIG. 6J
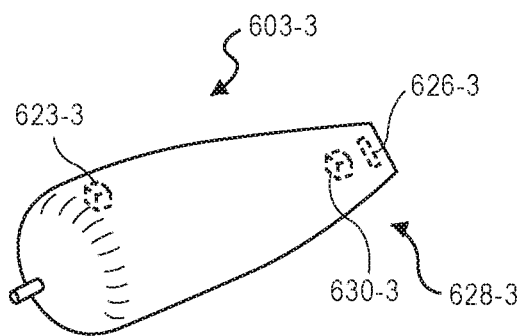
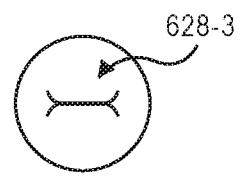
FIG. 6K    FIG. 6L

ADJUSTABLE MOTOR FAIRINGS FOR AERIAL VEHICLES

BACKGROUND

Unmanned vehicles, such as unmanned aerial vehicles ("UAV"), ground and water based automated vehicles, are continuing to increase in use. For example, UAVs are often used by hobbyists to obtain aerial images of buildings, landscapes, etc. Likewise, unmanned ground based units are often used in materials handling facilities to autonomously transport inventory within the facility. While there are many beneficial uses of these vehicles, balancing the tightly coupled vehicle performance parameters of stability, maneuverability, and energy efficiency introduces design complexities of the UAVs. For example, various components of aerial vehicles may cause aerodynamic drag in different flight configurations. In addition, some components may be designed to reduce aerodynamic drag in one flight configuration, but may nonetheless contribute to aerodynamic drag in another flight configuration. Accordingly, there is a need for systems and methods to reduce aerodynamic drag and improve control and safety of aerial vehicles in various flight configurations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 6I illustrates a perspective view of an example adjustable motor fairing having third actuatable elements in a retracted position, in accordance with disclosed implementations.

FIG. 6J illustrates a rear view of the example adjustable motor fairing having the third actuatable elements in the retracted position as shown in FIG. 6I, in accordance with disclosed implementations.

FIG. 6K illustrates a perspective view of the example adjustable motor fairing having the third actuatable elements as shown in FIG. 6I in an extended position, in accordance with disclosed implementations.

FIG. 6L illustrates a rear view of the example adjustable motor fairing having the third actuatable elements in the extended position as shown in FIG. 6K, in accordance with disclosed implementations.

Figure 1:
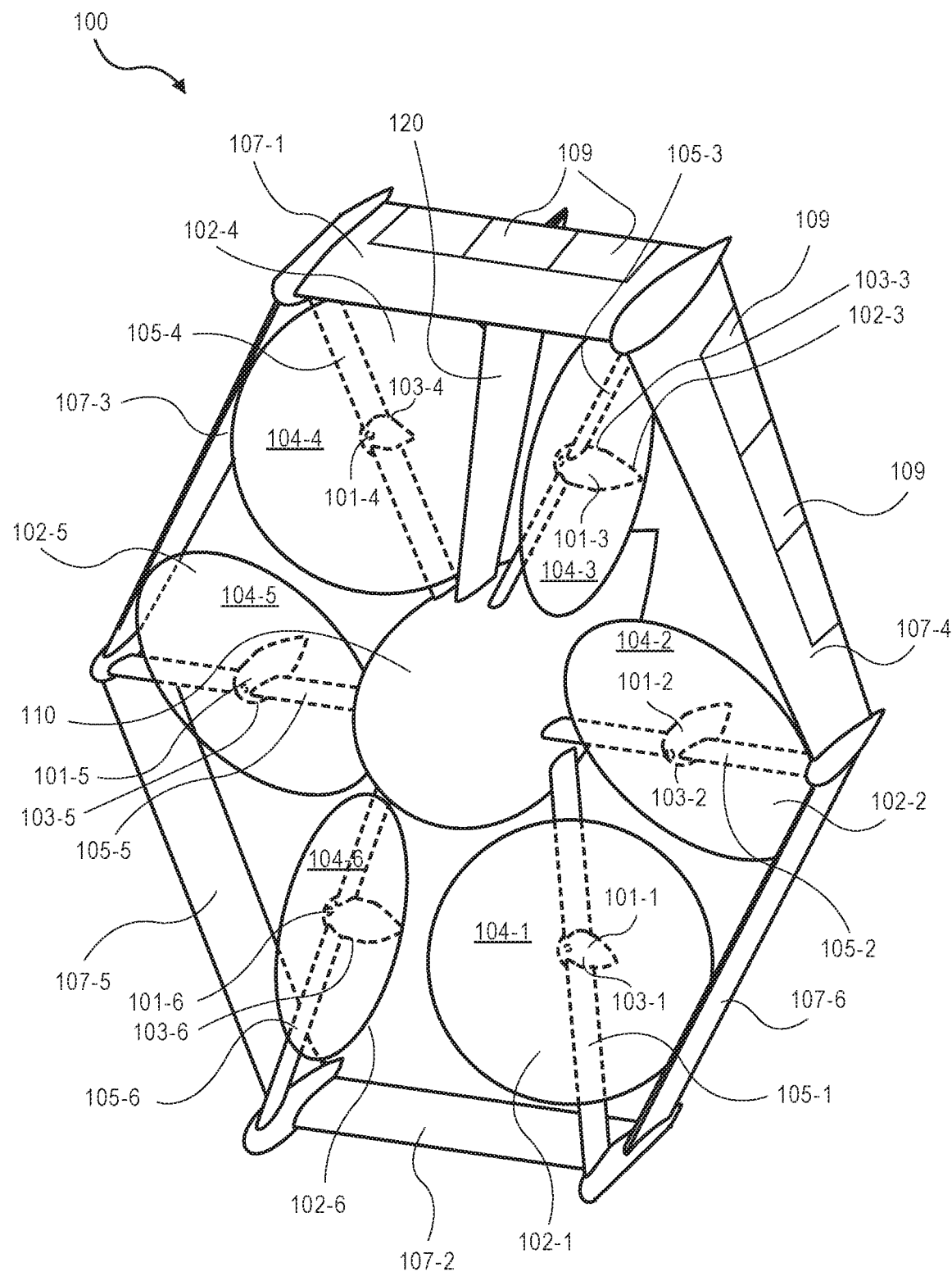
FIG. 1 illustrates a perspective view of an aerial vehicle with a substantially hexagonal shaped ring wing and adjustable motor fairings, in accordance with disclosed implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Systems and methods related to adjustable motor fairings for aerial vehicles are described herein. The adjustable motor fairings may be movably coupled to and at least partially surround respective motors. The adjustable motor fairings may reduce aerodynamic drag associated with respective motors in two or more flight configurations or orientations. In addition, systems and methods related to adjustable fairings for motor arms, struts, or other structural components of aerial vehicles are also described herein. The adjustable fairings may also be movably coupled to and at least partially surround respective motor arms, struts, or other structural components. The adjustable fairings may also reduce aerodynamic drag associated with respective motor arms, struts, or other structural components in two or more flight configurations or orientations.

In example embodiments, the adjustable motor fairings may be passively movably coupled to respective motors of aerial vehicles. The adjustable motor fairings may have a variety of shapes, such as teardrop, wing, or airfoil shapes, and may also include various vanes, fins, tails, or other aerodynamic structures. In addition, the adjustable motor fairings may change positions based at least in part on airflow around the fairings via one or more movable and/or rotatable joints or connections. For example, an adjustable motor fairing may change between a first position associated with a vertical flight configuration of an aerial vehicle, and a second position associated with a horizontal flight configuration of the aerial vehicle.

In other example embodiments, the adjustable motor fairings may be movably coupled to respective motors of aerial vehicles, and may be actuated to move between two or more positions via one or more movable and/or rotatable joints or connections and associated one or more actuators. The adjustable motor fairings may be moved between positions to affect flight and/or control characteristics of aerial vehicles. For example, an adjustable motor fairing may be moved between a first position associated with reduced aerodynamic drag of an aerial vehicle, and a second position associated with a desired flight maneuver of the aerial vehicle.

In further example embodiments, the adjustable motor fairings may include one or more actuatable elements that may be actuated to modify shapes of outer surfaces of the adjustable motor fairings. The one or more actuatable elements may include vanes, fins, flaps, tabs, tails, control surfaces, or other actuatable elements. In addition, the one or more actuatable elements, such as bladders or other internal movable elements, may be internal to the adjustable motor fairings and configured to modify outer surfaces of the adjustable motor fairings.

In additional example embodiments, the adjustable fairings may be passively movably coupled to respective motor arms, struts, or other structural components of aerial vehicles. The adjustable fairings may change positions based at least in part on airflow around the fairings via one or more movable and/or rotatable joints or connections. For example, an adjustable fairing may change between a first position associated with a vertical flight configuration of an aerial vehicle, and a second position associated with a horizontal flight configuration of the aerial vehicle.

In this manner, the adjustable motor fairings, as well as other adjustable fairings as described herein, may reduce aerodynamic drag associated with aerial vehicles by modifying positions, shapes, and/or configurations of the fairings between two or more flight configurations or orientations. Furthermore, the adjustable motor fairings may also be actuated between two or more flight configurations or orientations in some example embodiments, in order to provide additional control for aerial vehicles.

FIG. 1 illustrates a perspective view of an aerial vehicle 100 with a substantially hexagonal shaped ring wing and adjustable motor fairings, in accordance with disclosed implementations. The aerial vehicle 100 includes six propulsion mechanisms 102-1, 102-2, 102-3, 102-4, 102-5, and 102-6 spaced about the fuselage or body 110 of the aerial vehicle 100. As discussed herein, while the propulsion mechanisms 102 may include motors 101-1, 101-2, 101-3, 101-4, 101-5, and 101-6 and propellers 104-1, 104-2, 104-3, 104-4, 104-5, and 104-6, in other implementations, other forms of propulsion may be utilized as the propulsion mechanisms 102. For example, one or more of the propulsion mechanisms 102 of the aerial vehicle 100 may utilize fans, jets, turbojets, turbo fans, jet engines, and/or the like to maneuver the aerial vehicle. Generally described, a propulsion mechanism 102, as used herein, includes any form of propulsion mechanism that is capable of generating a force sufficient to maneuver the aerial vehicle, alone and/or in combination with other propulsion mechanisms. Furthermore, in selected implementations, propulsion mechanisms (e.g., 102-1, 102-2, 102-3, 102-4, 102-5, and 102-6) may be configured such that their individual orientations may be dynamically modified (e.g., change from vertical to horizontal flight configuration or orientation, or any other configuration or orientation therebetween).

Likewise, while the examples herein describe the propulsion mechanisms being able to generate force in either direction, in some implementations, the propulsion mechanisms may only generate force in a single direction. However, the orientation of the propulsion mechanism may be adjusted so that the force can be oriented in a positive direction, a negative direction, and/or any other direction.

In this implementation, the aerial vehicle 100 also includes a ring wing 107 having a substantially hexagonal shape that extends around and forms the perimeter of the aerial vehicle 100. In the illustrated example, the ring wing has six sections or segments 107-1, 107-2, 107-3, 107-4, 107-5, and 107-6 that are joined at adjacent ends to form the ring wing 107 around the aerial vehicle 100. Each segment of the ring wing 107 has an airfoil shape to produce lift when the aerial vehicle is oriented as illustrated in FIG. 1 and moving in a direction that is substantially horizontal. As illustrated, and discussed further below, the ring wing is positioned at an angle with respect to the fuselage or body 110 such that the lower segment 107-2 of the ring wing acts as a front wing as it is toward the front of the aerial vehicle when oriented as shown and moving in a horizontal direction. The upper segment 107-1 of the ring wing, which has a longer chord length than the lower segment 107-2 of the ring wing 107, is farther back and thus acts as a rear wing.

The ring wing 107 is secured to the fuselage or body 110 by motor arms 105. In this example, all six motor arms 105-1, 105-2, 105-3, 105-4, 105-5, and 105-6 are coupled to the fuselage at one end, extend from the fuselage 110 and couple to the ring wing 107 at a second end, thereby securing the ring wing 107 to the fuselage 110. In other implementations, less than all of the motor arms may extend from the fuselage 110 and couple to the ring wing 107. For example, motor arms 105-2 and 105-5 may be coupled to the fuselage 110 at one end and extend outward from the fuselage but not couple to the ring wing 107.

In some implementations, the aerial vehicle may also include one or more stabilizer fins 120 that extend from the fuselage or body 110 to the ring wing 107. The stabilizer fin 120 may also have an airfoil shape. In the illustrated example, the stabilizer fin 120 extends vertically from the fuselage 110 to the ring wing 107. In other implementations, the stabilizer fin may be at other positions. For example, the stabilizer fin may extend downward from the fuselage between motor arm 105-1 and motor arm 105-6.

In general, one or more stabilizer fins may extend from the fuselage or body 110, between any two motor arms 105 and couple to an interior of the ring wing 107. For example, stabilizer fin 120 may extend upward between motor arms 105-3 and 105-4, a second stabilizer fin may extend from the fuselage and between motor arms 105-5 and 105-6, and a third stabilizer fin may extend from the fuselage and between motor arms 105-1 and 105-2.

Likewise, while the illustrated example shows the stabilizer fin extending from the fuselage or body 110 at one end and coupling to the interior of the ring wing 107 at a second end, in other implementations, one or more of the stabilizer fin(s) may extend from the fuselage and not couple to the ring wing or may extend from the ring wing and not couple to the fuselage. In some implementations, one or more stabilizer fins may extend from the exterior of the ring wing 107, one or more stabilizer fins may extend from the interior of the ring wing 107, one or more stabilizer fins may extend from the fuselage 110, and/or one or more stabilizer fins may extend from the fuselage 110 and couple to the interior of the ring wing 107.

The fuselage or body 110, motor arms 105, stabilizer fin 120, and ring wing 107 of the aerial vehicle 100 may be formed of any one or more suitable materials, such as graphite, carbon fiber, aluminum, metals, plastics, or combinations thereof.

Each of the propulsion mechanisms 102 are coupled to a respective motor arm 105 (or propulsion mechanism arm) such that the propulsion mechanism 102 is substantially contained within the perimeter of the ring wing 107. For example, propulsion mechanism 102-1 is coupled to motor arm 105-1, propulsion mechanism 102-2 is coupled to motor arm 105-2, propulsion mechanism 102-3 is coupled to motor arm 105-3, propulsion mechanism 102-4 is coupled to motor arm 105-4, propulsion mechanism 102-5 is coupled to motor arm 105-5, and propulsion mechanism 102-6 is coupled to motor arm 105-6. In the illustrated example, each propulsion mechanism 102-1, 102-2, 102-3, 102-4, 102-5, and 102-6 is coupled at an approximate mid-point of the respective motor arm 105-1, 105-2, 105-3, 105-4, 105-5, and 105-6 between the fuselage 110 and the ring wing 107. In other embodiments, some propulsion mechanisms 102 may be coupled toward an end of the respective motor arm 105. In other implementations, the propulsion mechanisms may be coupled at other locations along the motor arm. Likewise, in some implementations, some of the propulsion mechanisms may be coupled to a mid-point of the motor arm and some of the propulsion mechanisms may be coupled at other locations along respective motor arms (e.g., closer toward the fuselage 110 or closer toward the ring wing 107).

As illustrated, the propulsion mechanisms 102 may be oriented at different angles with respect to each other. For example, propulsion mechanisms 102-2 and 102-5 are aligned with the fuselage or body 110 such that the force generated by each of propulsion mechanisms 102-2 and 102-5 is in-line or in the same direction or orientation as the fuselage. In the illustrated example, the aerial vehicle 100 is oriented for horizontal flight such that the fuselage is oriented horizontally in the direction of travel. In such an orientation, the propulsion mechanisms 102-2 and 102-5 provide horizontal forces, also referred to herein as thrusting forces and act as thrusting propulsion mechanisms.

In comparison to propulsion mechanisms 102-2 and 102-5, each of propulsion mechanisms 102-1, 102-3, 102-4, and 102-6 are offset or angled with respect to the orientation of the fuselage or body 110. When the aerial vehicle 100 is oriented horizontally as shown in FIG. 1 for horizontal flight, the propulsion mechanisms 102-1, 102-3, 102-4, and 102-6 may be used as propulsion mechanisms, providing thrust in a non-horizontal direction to cause the aerial vehicle to pitch, yaw, roll, heave and/or sway. In other implementations, during horizontal flight, the propulsion mechanisms 102-1, 102-3, 102-4, and 102-6 may be disabled such that they do not produce any forces and the aerial vehicle 100 may be propelled aerially in a horizontal direction as a result of the lifting force from the aerodynamic shape of the ring wing 107 and the horizontal thrust produced by the thrusting propulsion mechanisms 102-2 and 102-5.

In some implementations, one or more segments of the ring wing 107 may include ailerons, control surfaces, and/or trim tabs 109 that may be adjusted to control the aerial flight of the aerial vehicle 100. For example, one or more ailerons, control surfaces, and/or trim tabs 109 may be included on the upper segment 107-1 of the ring wing 107 and/or one or more ailerons, control surfaces, and/or trim tabs 109 may be included on the side segments 107-4 and/or 107-3. Further, one or more ailerons, control surfaces, and/or trim tabs 109 may also be included on one or more of the remaining segments 107-2, 107-5, and 107-6. The ailerons, control surfaces, and/or trim tabs 109 may be operable to control the pitch, yaw, and/or roll of the aerial vehicle during horizontal flight when the aerial vehicle 100 is oriented as illustrated in FIG. 1. Further, other components may also be coupled to the surface of the ring wing. For example, other components may include, but are not limited to, sensors, imaging elements, range finders, identifying markers, navigation components, such as global positioning satellite antennas, antennas, etc.

In further implementations, one or more of the propulsion mechanisms 102 may include respective adjustable motor fairings 103. For example, adjustable motor fairings 103-1, 103-2, 103-3, 103-4, 103-5, 103-6 may be coupled to and at least partially surround respective motors 101-1, 101-2, 101-3, 101-4, 101-5, 101-6, e.g., for aerodynamic purposes, to provide clearance for relative movement and/or rotation, for noise management, for safety reasons, and/or for other reasons. Alternatively or in addition, the adjustable motor fairings 103-1, 103-2, 103-3, 103-4, 103-5, 103-6 may be coupled to respective motor arms 105-1, 105-2, 105-3, 105-4, 105-5, 105-6. The adjustable motor fairings 103 of the aerial vehicle 100 may be formed of any one or more suitable materials, such as graphite, carbon fiber, aluminum, plastics, metals, or combinations thereof. Further, the adjustable motor fairings 103 may be movable and/or rotatable relative to respective motors 101 and corresponding propellers 104, and/or relative to respective motor arms 105. For example, the adjustable motor fairings 103 may be passively movably coupled to respective motors 101 and/or motor arms 105, and move between two or more configurations or positions based at least in part on airflow around the fairings 103, e.g., to reduce aerodynamic drag. In addition, the adjustable motor fairings 103 may also be actively movably coupled to respective motors 101 and/or motors arms 105, and may be moved via one or more actuators between two or more configurations or positions to modify flight and/or control characteristics of an aerial vehicle. As a result, the adjustable motor fairings 103 may be actively controlled to modify flight characteristics of an aerial vehicle similar to ailerons, control surfaces, and/or trim tabs 109, and in some cases, the adjustable motor fairings 103 may take the place of one or more ailerons, control surfaces, and/or trim tabs 109 to provide control of flight characteristics, e.g., pitch, yaw, and/or roll of the aerial vehicle.

The angle of orientation of each of the propulsion mechanisms 102-1, 102-2, 102-3, 102-4, 102-5, and 102-6 may vary for different implementations. Likewise, in some implementations, the offset of the propulsion mechanisms 102-1, 102-2, 102-3, 102-4, 102-5, and 102-6 may each be the same, with some oriented in one direction and some oriented in another direction, may each be oriented different amounts, and/or in different directions.

In the illustrated example of FIG. 1, each propulsion mechanism 102-1, 102-2, 102-3, 102-4, 102-5, and 102-6 may be oriented approximately thirty degrees with respect to the position of each respective motor arm 105-1, 105-2, 105-3, 105-4, 105-5, and 105-6. In addition, the direction of orientation of the propulsion mechanisms is such that pairs of propulsion mechanisms are oriented toward one another. For example, propulsion mechanism 102-1 is oriented approximately thirty degrees toward propulsion mechanism 102-6. Likewise, propulsion mechanism 102-2 is oriented approximately thirty degrees in a second direction about the second motor arm 105-2 and oriented toward propulsion mechanism 102-3. Finally, propulsion mechanism 102-4 is oriented approximately thirty degrees in the first direction about the fourth motor arm 105-4 and toward propulsion 102-5. As illustrated, propulsion mechanisms 102-2 and 102-5, which are on opposing sides of the fuselage 110, are aligned and oriented in a same first direction (in this example, horizontal). Propulsion mechanisms 102-3 and 102-6, which are on opposing sides of the fuselage 110, are aligned and oriented in a same second direction, which is angled compared to the first direction. Propulsion mechanisms 102-1 and 102-4, which are on opposing sides of the fuselage 110, are aligned and oriented in a same third direction, which is angled compared to the first direction and the second direction.

Figure 2:
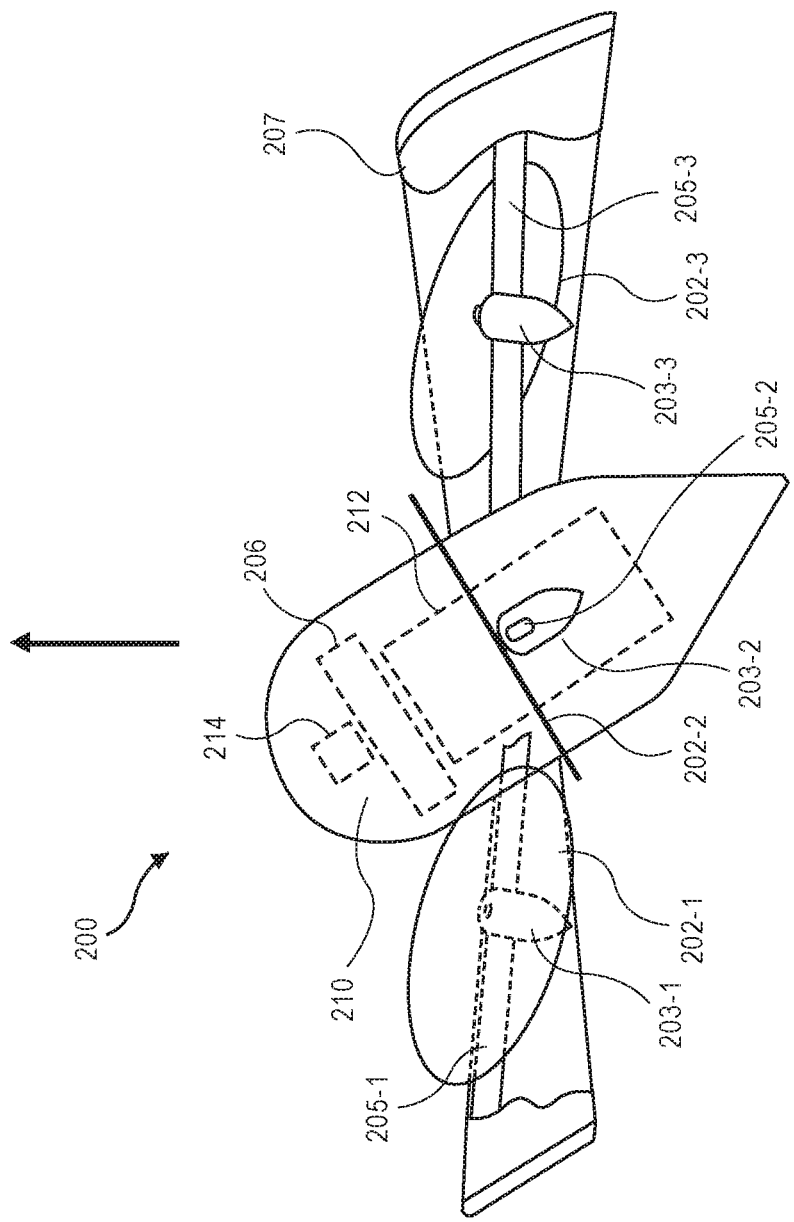
FIG. 2 illustrates a side view of an aerial vehicle with a substantially hexagonal shaped ring wing and adjustable motor fairings in a substantially vertical flight configuration, in accordance with disclosed implementations.

FIG. 2 illustrates a side view of an aerial vehicle 200 with a substantially hexagonal shaped ring wing and adjustable motor fairings in a substantially vertical flight configuration, in accordance with disclosed implementations. The aerial vehicle 200 corresponds to the aerial vehicle 100 discussed above with respect to FIG. 1. When oriented as illustrated in FIG. 2, the aerial vehicle may maneuver in any of the six degrees of freedom (pitch, yaw, roll, heave, surge, and sway), thereby enabling vertical takeoff and landing (VTOL) and high maneuverability. As shown in FIG. 2, a portion of the ring wing 207 is cut away or removed from the illustration in order to better illustrate various features of the aerial vehicle 200, including propulsion mechanisms 202, adjustable motor fairings 203, and motor arms 205.

As illustrated, when the aerial vehicle is oriented for vertical flight, the motor arms and the ring wing 207 are aligned approximately horizontally and in the same plane. In this orientation, each of the propulsion mechanisms are offset or angled with respect to the horizontal and/or vertical direction. As such, each propulsion mechanism 202, when generating a force, generates a force that includes both a horizontal component and a vertical component. In the illustrated example, each propulsion mechanism is angled approximately thirty degrees with respect to vertical. Likewise, as discussed above, adjacent propulsion mechanisms are angled in opposing directions to form pairs of propulsion mechanisms. For example, propulsion mechanism 202-2 is oriented toward propulsion mechanism 202-3. As discussed further below, angling adjacent propulsion mechanisms toward one another to form pairs of propulsion mechanisms allows horizontal forces from each propulsion mechanism to cancel out such that the pair of propulsion mechanisms can produce a net vertical force. Likewise, if one of the propulsion mechanisms of a pair of propulsion mechanisms is producing a larger force than the other propulsion mechanism of the pair, a net horizontal force will result from the pair of propulsion mechanisms. Accordingly, when the aerial vehicle 200 is oriented for vertical flight with angled propulsion mechanisms, as illustrated in FIG. 2, the aerial vehicle can move independently in any of the six degrees of freedom. For example, if the aerial vehicle is to surge in the X direction, it can do so by altering the forces produced by the propulsion mechanisms to generate a net horizontal force in the X direction without having to pitch forward to enable a surge in the X direction.

To enable the fuselage or body to be oriented horizontally with an offset ring wing 207 during horizontal flight, as illustrated in FIG. 1, the fuselage is rotated at an angle when the aerial vehicle 200 is oriented for vertical flight, as illustrated in FIG. 2. In this example the fuselage 210 is angled at approximately thirty degrees from vertical. In other implementations, the amount of rotation from vertical may be greater or less depending on the amount of offset desired for the ring wing 207 when the aerial vehicle 200 is oriented for horizontal flight.

Further, in the vertical flight configuration, the adjustable motor fairings 203-1, 203-2, 203-3 that may be coupled to respective propulsion mechanisms 202-1, 202-2, 202-3 and/or respective motor arms 205-1, 205-2, 205-3 may be configured or oriented in a first position. For example, during vertical flight, each of the adjustable motor fairings 203 that is passively movably coupled to a respective propulsion mechanism 202 and/or respective motor arm 205 may be oriented or aligned substantially parallel with a rotational axis of the respective propulsion mechanism 202 to reduce aerodynamic drag. In addition, adjustable motor fairings 203 that are actively movably coupled to respective propulsion mechanisms 202 and/or respective motor arms 205 may be actuated to a first position to affect flight characteristics of the aerial vehicle, e.g., to reduce aerodynamic drag, and/or to apply forces or moments to cause pitch, yaw, and/or roll of the aerial vehicle.

The aerial vehicle may also include one or more landing gears (not shown) that are extendable to a landing position. During flight, the landing gear may be retracted into the interior of the ring wing 207 and/or may be rotated up and remain along the trailing edge of the ring wing. In still other examples, the landing gear may be permanently affixed.

The fuselage or body 210 may be used to house or store one or more components of the aerial vehicle, such as the aerial vehicle control system 214, a power module 206, and/or a payload 212 that is transported by the aerial vehicle. The aerial vehicle control system 214 is discussed further below with respect to FIG. 9. The power module(s) 206 may be removably mounted to the aerial vehicle 200. The power module(s) 206 for the aerial vehicle may be, for example, in the form of battery power, solar power, gas power, super capacitor, fuel cell, alternative power generation source, or a combination thereof. The power module(s) 206 are coupled to and provide power for the aerial vehicle control system 214, the propulsion mechanisms 202, various actuators, and the payload engagement module (not shown).

In some implementations, one or more of the power modules may be configured such that it can be autonomously removed, recharged, and/or replaced with another power module. For example, when the aerial vehicle lands at a delivery location, relay location and/or materials handling facility, the aerial vehicle may engage with a charging member at the location that will recharge the power module.

The payload 212 may be any payload that is to be transported by the aerial vehicle. In some implementations, the aerial vehicle may be used to aerially deliver items ordered by customers for aerial delivery and the payload may include one or more customer ordered items. For example, a customer may order an item from an electronic commerce website and the item may be delivered to a customer specified delivery location using the aerial vehicle 200.

In some implementations, the fuselage or body 210 may include a payload engagement module (not shown). For example, the payload engagement module may be a hinged portion of the fuselage 210 that can rotate between an open position, in which the interior of the fuselage is accessible so that the payload 212 may be added to or removed from the fuselage, and a closed position so that the payload 212 is secured within the interior of the fuselage.

Figure 3:
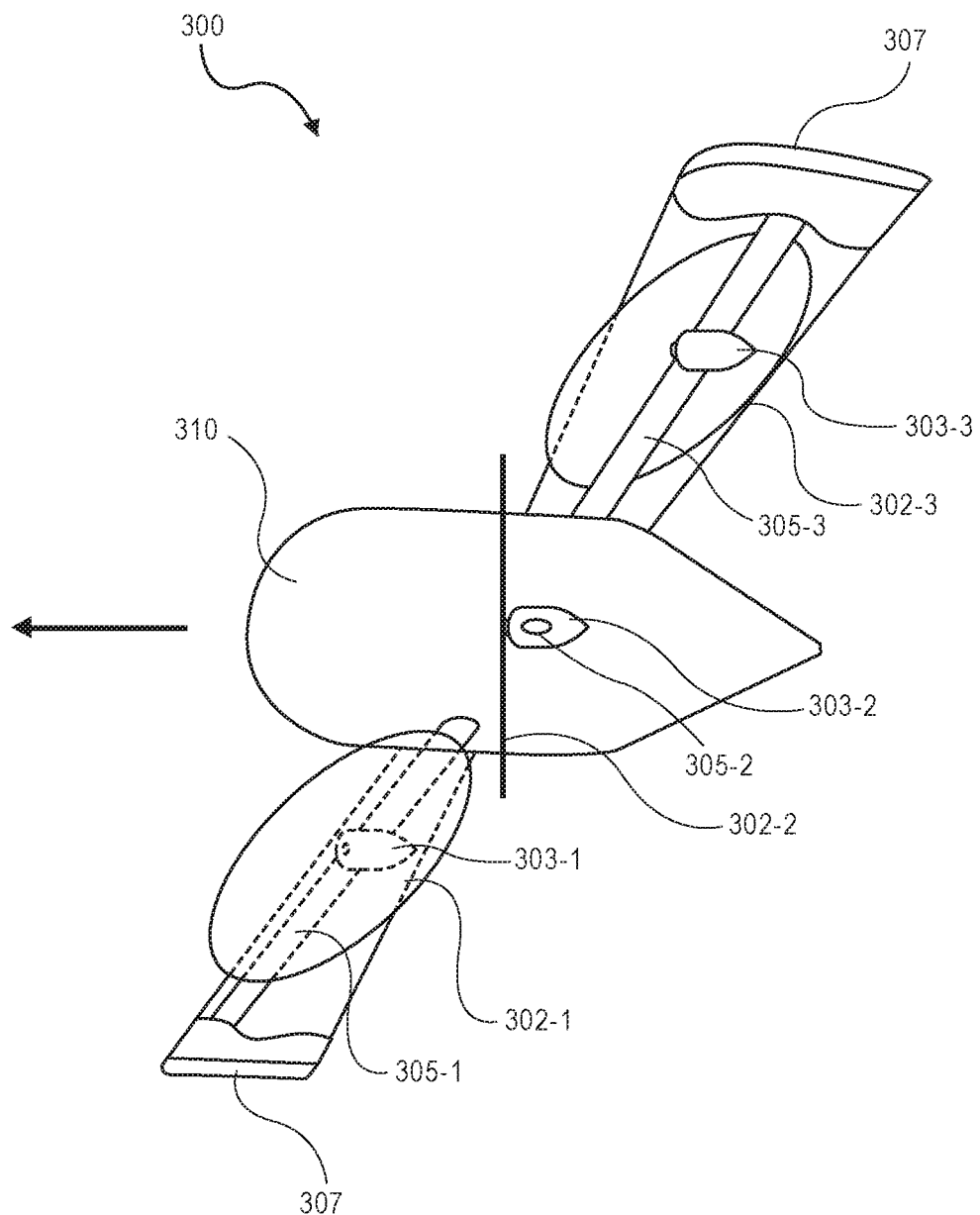
FIG. 3 illustrates a side view of an aerial vehicle with a substantially hexagonal shaped ring wing and adjustable motor fairings in a substantially horizontal flight configuration, in accordance with disclosed implementations.

FIG. 3 illustrates a side view of an aerial vehicle 300 with a substantially hexagonal shaped ring wing and adjustable motor fairings in a substantially horizontal flight configuration, in accordance with disclosed implementations. The aerial vehicle 300 corresponds to the aerial vehicle 100 discussed in FIG. 1 and aerial vehicle 200 discussed in FIG. 2. As shown in FIG. 3, a portion of the ring wing 307 is cut away or removed from the illustration in order to better illustrate various features of the aerial vehicle 300, including propulsion mechanisms 302, adjustable motor fairings 303, and motor arms 305.

As illustrated in FIG. 3, when the aerial vehicle is oriented for horizontal flight, the fuselage or body 310 is oriented horizontally and two of the propulsion mechanisms, propulsion mechanism 302-2 and the propulsion mechanism on the opposing side of the fuselage and illustrated in FIG. 1, are oriented to produce thrust in a substantially horizontal direction. In comparison, the other propulsion mechanisms, such as propulsion mechanisms 302-1 and 302-3, may not be oriented to produce forces in substantially the horizontal direction. During horizontal flight, the propulsion mechanisms, such as propulsion mechanism 302-1 and 302-3, may be disabled and/or used to produce maneuverability forces that will cause the aerial vehicle to pitch, yaw, and/or roll as it aerially navigates in a substantially horizontal direction. In some implementations, the propulsion mechanisms that are not aligned to produce substantially horizontal forces may be allowed to freely rotate in the wind and energy produced from the rotation may be used to charge the power module of the aerial vehicle 300.

Further, in the horizontal flight configuration, the adjustable motor fairings 303-1, 303-2, 303-3 that may be coupled to respective propulsion mechanisms 302-1, 302-2, 302-3 and/or respective motor arms 305-1, 305-2, 305-3 may be configured or oriented in a second position. For example, during horizontal flight, adjustable motor fairings 303 that are passively movably coupled to respective propulsion mechanisms 302 and/or respective motor arms 305 may be oriented or aligned substantially parallel to the direction of horizontal flight to reduce aerodynamic drag. In addition, adjustable motor fairings 303 that are actively movably coupled to respective propulsion mechanisms 302 and/or respective motor arms 305 may be actuated to a second position to affect flight and/or control characteristics of the aerial vehicle, e.g., to reduce aerodynamic drag, and/or to apply forces or moments to cause pitch, yaw, and/or roll of the aerial vehicle.

The ring wing 307 is angled such that the lower segment of the ring wing is positioned ahead of the upper segment of the ring wing 307. The leading wing, lower segment produces a much higher lift per square inch than the rear wing, upper segment, and the chord length of the lower segment is less than the chord length of the upper segment. Likewise, as illustrated, the upper segment of the ring wing has a different camber than the lower segment. The chord length and camber transition from that illustrated along the upper segment to the lower segment. In implementations that include one or more stabilizer fins, such as stabilizer fin 120 (FIG. 1), the difference between the chord lengths of the lower segment and the upper segment may be less and/or the difference between the cambers of the lower segment and the upper segment may be less.

While the side segments of the ring wing provide some lift, at the midpoint of each side segment there is minimal lift produced by the ring wing 307. Because there is minimal lift produced at the midpoint, the segments may be tapered to reduce the overall weight of the aerial vehicle. In this example, the side segments may be tapered toward the mid-point but retain some dimension for structural integrity and to operate as a protective barrier around the propulsion mechanisms 302. While the illustrated examples show the side segments tapering to a smaller end at the midpoint, in other implementations, the taper may be consistent from the larger top segment to the smaller lower segment.

In addition to providing lift, the ring wing 307 provides a protective barrier or shroud that surrounds the propulsion mechanisms 302 of the aerial vehicle 300. The protective barrier of the ring wing 307 increases the safety of the aerial vehicle. For example, if the aerial vehicle comes into contact with another object, there is a higher probability that the object will contact the ring wing, rather than a propulsion mechanism.

In order to transition the aerial vehicle from a vertical flight orientation, as illustrated in FIG. 2, to a horizontal flight orientation, as illustrated in FIG. 3, forces generated by each of the propulsion mechanisms will cause the aerial vehicle to pitch forward and increase in speed in the horizontal direction. As the horizontal speed increases and the pitch increases, the lifting force produced by the airfoil shape of the ring wing will increase which will further cause the aerial vehicle to pitch into the horizontal flight orientation and allow the aerial vehicle to remain airborne. In addition, the adjustable motor fairings may move, either passively or actively, to a horizontal flight configuration or orientation based at least in part on airflow around the fairings during horizontal flight.

In contrast, as discussed below, when the aerial vehicle is to transition from a horizontal flight orientation to a vertical flight orientation, forces from the propulsion mechanisms may cause the aerial vehicle to decrease pitch and reduce horizontal speed. As the pitch of the aerial vehicle decreases, the lift produced by the airfoil shape of the ring wing decreases and the thrust produced by each of the propulsion mechanisms are utilized to maintain flight of the aerial vehicle. In addition, the adjustable motor fairings may move, either passively or actively, to a vertical flight configuration or orientation based at least in part on airflow around the fairings during vertical flight.

As illustrated in FIGS. 1-3, each of the propulsion mechanisms are positioned in approximately the same plane that is substantially aligned with the ring wing. Likewise, each propulsion mechanism is spaced approximately sixty degrees from each other around the fuselage or body, such that the propulsion mechanisms are positioned at approximately equal distances with respect to one another and around the fuselage or body of the aerial vehicle. For example, the second propulsion mechanism 102-2 and the fifth propulsion mechanism 102-5, as shown in FIG. 1, may each be positioned along the X axis. The third propulsion mechanism 102-3 may be positioned at approximately sixty degrees from the X axis and the fourth propulsion mechanism 102-4 may be positioned approximately one-hundred and twenty degrees from the X axis. Likewise, the first propulsion mechanism 102-1 and the sixth propulsion mechanism 102-6 may likewise be positioned approximately sixty and one-hundred and twenty degrees from the X axis in the negative direction.

In other implementations, the spacing between the propulsion mechanisms may be different. For example, propulsion mechanisms 102-1, 102-3, and 102-5 as shown in FIG. 1, which are oriented in the first direction, may each be approximately equally spaced 120 degrees apart and propulsion mechanisms 102-2, 102-4, and 102-6 as shown in FIG. 1, which are oriented in the second direction, may also be approximately equally spaced 120 degrees apart. However, the spacing between propulsion mechanisms oriented in the first direction and propulsion mechanisms oriented in the second direction may not be equal. For example, the propulsion mechanisms 102-1, 102-3, and 102-5, oriented in the first direction, may be positioned at approximately zero degrees, approximately 120 degrees, and approximately 240 degrees around the perimeter of the aerial vehicle with respect to the X axis, and the propulsion mechanisms 102-2, 102-4, and 102-6, oriented in the second direction, may be positioned at approximately 10 degrees, approximately 130 degrees, and approximately 250 degrees around the perimeter of the aerial vehicle with respect to the X axis.

In other implementations, the propulsion mechanisms may have other alignments. Likewise, in other implementations, there may be fewer or additional propulsion mechanisms. Likewise, in some implementations, the propulsion mechanisms may not all be aligned in the same plane and/or the ring wing may be in a different plane than some or all of the propulsion mechanisms.

While the examples discussed above and illustrated in FIGS. 1-3 discuss rotating the propulsion mechanisms approximately thirty degrees about each respective motor arm and that the ring wing is offset approximately thirty degrees with respect to the fuselage or body, in other implementations, the orientation of the propulsion mechanisms and/or the ring wing may be greater or less than thirty degrees and the angle of the ring wing may be different than the angle of one or more propulsion mechanisms. In some implementations, if maneuverability of the aerial vehicle when the aerial vehicle is in a vertical flight orientation is of higher importance, the orientation of the propulsion mechanisms may be higher than thirty degrees. For example, each of the propulsion mechanisms may be oriented approximately forty-five degrees about each respective motor arm, in either the first or second direction. In comparison, if the lifting force of the aerial vehicle when the aerial vehicle is in the vertical flight orientation is of higher importance, the orientation of the propulsion mechanisms may be less than thirty degrees. For example, each propulsion mechanism may be oriented approximately ten degrees from a vertical orientation about each respective motor arm.

In some implementations, the orientations of some propulsion mechanisms may be different than other propulsion mechanisms. For example, propulsion mechanisms 102-1, 102-3, and 102-5 as shown in FIG. 1, may each be oriented approximately fifteen degrees in the first direction and propulsion mechanisms 102-2, 102-4, and 102-6 as shown in FIG. 1, may each be oriented approximately twenty-five degrees in the second direction. In still other examples, pairs of propulsion mechanisms may have different orientations than other pairs of propulsion mechanisms. For example, propulsion mechanisms 102-1 and 102-6 may each be oriented approximately thirty degrees in the first direction and second direction, respectively, toward one another, propulsion mechanisms 102-3 and 102-2 may each be oriented approximately forty-five degrees in the first direction and second direction, respectively, toward one another, and propulsion mechanisms 102-5 and 102-4 may each be oriented approximately forty-five degrees in the first direction and second direction, respectively, toward one another.

As discussed below, by orienting propulsion mechanisms partially toward one another in pairs, as illustrated, the lateral or horizontal forces generated by the pairs of propulsion mechanisms, when producing the same amount of force, will cancel out such that the sum of the forces from the pair is only in a substantially vertical direction (Z direction), when the aerial vehicle is in the vertical flight orientation. Likewise, as discussed below, if one propulsion mechanism of the pair produces a force larger than a second propulsion mechanism, a lateral or horizontal force will result in the X direction and/or the Y direction, when the aerial vehicle is in the vertical flight orientation. A horizontal force produced from one or more of the pairs of propulsion mechanisms enables the aerial vehicle to translate in a horizontal direction and/or yaw without altering the pitch of the aerial vehicle, when the aerial vehicle is in the vertical flight orientation. Producing lateral forces by multiple pairs of propulsion mechanisms enables the aerial vehicle to operate independently in any of the six degrees of freedom (surge, sway, heave, pitch, yaw, and roll). As a result, the stability and maneuverability of the aerial vehicle is increased.

While the implementations illustrated in FIGS. 1-3 include six motor arms that extend radially from a central portion of the aerial vehicle and are coupled to the ring wing, in other implementations, there may be fewer or additional motor arms. For example, the aerial vehicle may include support arms that extend between the motor arms and provide additional support to the aerial vehicle. As another example, not all of the motor arms may extend to and couple with the ring wing.

While the examples discussed above in FIGS. 1-3 describe a ring wing having a substantially hexagonal shape, in other implementations, the ring wing may have other shapes. For example, the ring wing may be substantially circular, square, rectangular, pentagonal, octagonal, etc. Further, while the examples discussed above include six propulsion mechanism arms, six propulsion mechanisms, six motors, and/or six propellers in a particular configuration, in other example embodiments, the aerial vehicles described herein may include various other types of aerial vehicles, such as aerial vehicles having fewer than six propulsion mechanism arms, motors, and propellers, aerial vehicles having greater than six propulsion mechanism arms, motors, and propellers, and/or aerial vehicles having configurations different from those described herein, such as quad-copters, octa-copters, or other configurations or shapes.

Figure 4A:
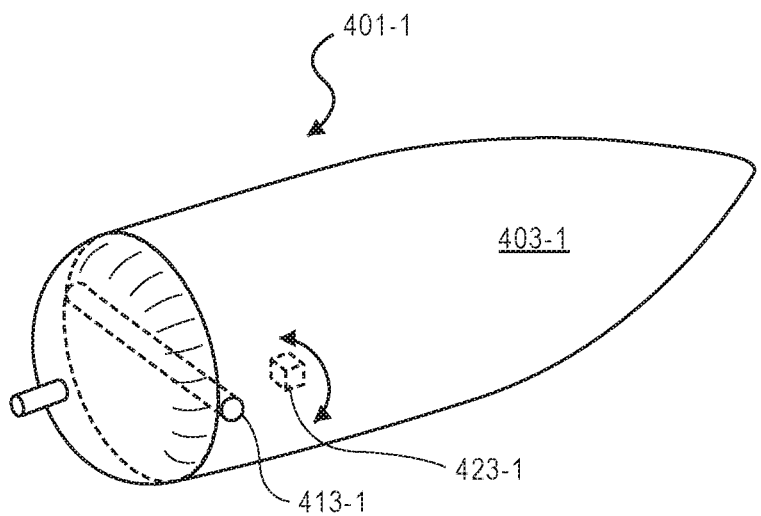
FIG. 4A illustrates a perspective view of a first example adjustable motor fairing, in accordance with disclosed implementations.

FIG. 4A illustrates a perspective view of a first example adjustable motor fairing 403-1, in accordance with disclosed implementations.

As shown in FIG. 4A, the adjustable motor fairing 403-1 may be coupled to a motor 401-1 or propulsion mechanism and/or may be coupled to a motor arm to which the motor 401-1 or propulsion mechanism is coupled. In addition, the adjustable motor fairing 403-1 may at least partially surround the motor 401-1 or propulsion mechanism and/or may at least partially surround a motor arm to which the motor 401-1 or propulsion mechanism is coupled, e.g., for aerodynamic purposes, to provide clearance for relative movement and/or rotation, for noise management, for safety reasons, and/or for other reasons.

The adjustable motor fairing 403-1 may have any of various shapes, including a teardrop or waterdrop shape, an axisymmetric shape, an elliptical shape, or various other aerodynamic shapes that may reduce aerodynamic drag. As shown in FIG. 4A, a leading surface of the adjustable motor fairing 403-1 may have a substantially spherical, dome, or other aerodynamic shape, and a trailing surface of the adjustable motor fairing 403-1 may have a tapered end or tip. In addition, a shaft that is rotated by the motor 401-1 is illustrated as extending out of the leading surface of the adjustable motor fairing 403-1, and a propeller may be coupled to and rotated by the shaft.

Further, the adjustable motor fairing 403-1 may be movable and/or rotatable around an axis defined by a rotatable joint 413-1. The rotatable joint 413-1 and corresponding axis may comprise a pin, rod, shaft, hinge, or other rotatable joint that may enable rotation of the adjustable motor fairing 403-1 around the axis. In addition, the rotatable joint 413-1 and corresponding axis may comprise a portion of a motor arm to which the adjustable motor fairing 403-1 is movably coupled.

In example embodiments, the adjustable motor fairing 403-1 may be passively movably coupled to the motor 401-1 and/or respective motor arm. In this manner, the adjustable motor fairing 403-1 may move and/or rotate based at least in part on airflow around the adjustable motor fairing 403-1, thereby reducing aerodynamic drag of an aerial vehicle comprising the adjustable motor fairing 403-1.

In other example embodiments, an actuator 423-1 may be associated with the adjustable motor fairing 403-1 and configured to actively move or rotate the adjustable motor fairing 403-1. For example, the actuator 423-1 may be a servo, solenoid, rotary actuator, linear actuator, geared actuator, screw actuator, magnetic actuator, piezoelectric actuator, or other type of actuator configured to move or rotate the adjustable motor fairing 403-1, thereby reducing aerodynamic drag and/or applying moments or forces to modify flight characteristics of an aerial vehicle comprising the adjustable motor fairing 403-1.

In example embodiments, the actuator 423-1 may include a servo that is configured to rotate the adjustable motor fairing 403-1 relative to the motor 401-1 and/or respective motor arm, e.g., via a direct rotatable connection at the rotatable joint 413-1, an indirect rotatable connection to the rotatable joint 413-1 such as with one or more gears, or a lever arm coupled to the rotatable joint 413-1. In addition, the actuator 423-1 may include a solenoid that is configured to rotate the adjustable motor fairing 403-1 relative to the motor 401-1 and/or respective motor arm, e.g., via an indirect rotatable connection to the rotatable joint 413-1 such as with one or more gears, or a lever arm coupled to the rotatable joint 413-1. Further, the actuator 423-1 may include a geared or screw actuator that is configured to rotate the adjustable motor fairing 403-1 relative to the motor 401-1 and/or respective motor arm, e.g., via one or more gears coupled to the rotatable joint 413-1 and driven by a rotary or linear actuator. Moreover, the actuator 423-1 may include a magnetic, piezoelectric, or other type of actuator that is configured to rotate the adjustable motor fairing 403-1 relative to the motor 401-1 and/or respective motor arm. Furthermore, the actuator 423-1 may comprise combinations of various types of actuators.

Figure 4B:
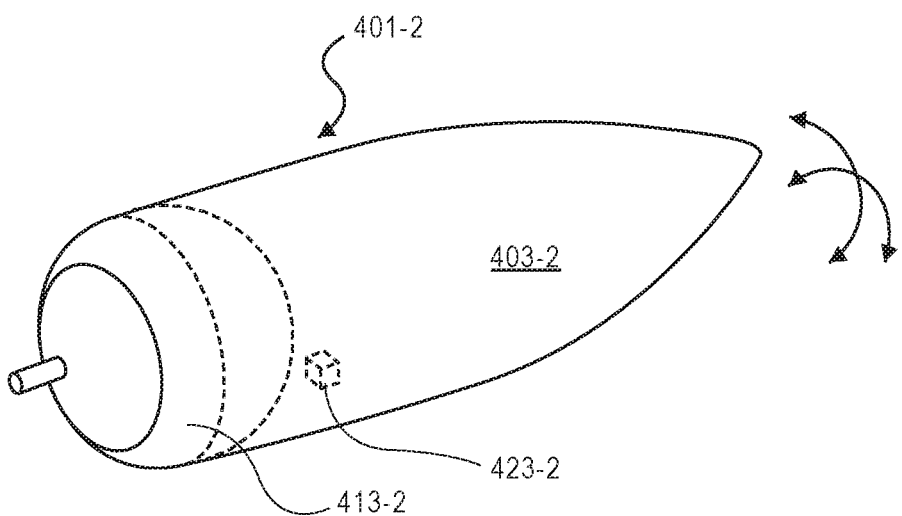
FIG. 4B illustrates a perspective view of a second example adjustable motor fairing, in accordance with disclosed implementations.

FIG. 4B illustrates a perspective view of a second example adjustable motor fairing 403-2, in accordance with disclosed implementations.

As shown in FIG. 4B, the adjustable motor fairing 403-2 may be coupled to a motor 401-2 or propulsion mechanism and/or may be coupled to a motor arm to which the motor 401-2 or propulsion mechanism is coupled. In addition, the adjustable motor fairing 403-2 may at least partially surround the motor 401-2 or propulsion mechanism and/or may at least partially surround a motor arm to which the motor 401-2 or propulsion mechanism is coupled, e.g., for aerodynamic purposes, to provide clearance for relative movement and/or rotation, for noise management, for safety reasons, and/or for other reasons.

The adjustable motor fairing 403-2 may have any of various shapes, including a teardrop or waterdrop shape, an axisymmetric shape, an elliptical shape, or various other aerodynamic shapes that may reduce aerodynamic drag. As shown in FIG. 4B, a leading surface of the adjustable motor fairing 403-2 may have a substantially spherical, dome, or other aerodynamic shape, and a trailing surface of the adjustable motor fairing 403-2 may have a tapered end or tip. In addition, a shaft that is rotated by the motor 401-2 is illustrated as extending out of the leading surface of the adjustable motor fairing 403-2, and a propeller may be coupled to and rotated by the shaft.

Further, the adjustable motor fairing 403-2 may be movable and/or rotatable around multiple axes or substantially 360 degrees of rotational freedom defined by a rotatable joint 413-2. The rotatable joint 413-2 and corresponding axes or rotational degrees of freedom may comprise a ball, bearing, sphere, hemisphere, or other rotatable joint that may enable rotation of the adjustable motor fairing 403-2 around multiple axes or rotational degrees of freedom. In addition, the rotatable joint 413-2 and corresponding axes or rotational degrees of freedom may comprise a portion of a motor arm to which the adjustable motor fairing 403-2 is movably coupled.

In example embodiments, the adjustable motor fairing 403-2 may be passively movably coupled to the motor 401-2 and/or respective motor arm. In this manner, the adjustable motor fairing 403-2 may move and/or rotate based at least in part on airflow around the adjustable motor fairing 403-2, thereby reducing aerodynamic drag of an aerial vehicle comprising the adjustable motor fairing 403-2.

In other example embodiments, an actuator 423-2 may be associated with the adjustable motor fairing 403-2 and configured to actively move or rotate the adjustable motor fairing 403-2. For example, the actuator 423-2 may be a servo, solenoid, rotary actuator, linear actuator, geared actuator, screw actuator, magnetic actuator, piezoelectric actuator, or other type of actuator configured to move or rotate the adjustable motor fairing 403-2, thereby reducing aerodynamic drag and/or applying moments or forces to modify flight characteristics of an aerial vehicle comprising the adjustable motor fairing 403-2.

In example embodiments, the actuator 423-2 may include a servo that is configured to rotate the adjustable motor fairing 403-2 relative to the motor 401-2 and/or respective motor arm, e.g., via a direct rotatable connection at the rotatable joint 413-2, an indirect rotatable connection to the rotatable joint 413-2 such as with one or more gears, or a lever arm coupled to the rotatable joint 413-2. In addition, the actuator 423-2 may include a solenoid that is configured to rotate the adjustable motor fairing 403-2 relative to the motor 401-2 and/or respective motor arm, e.g., via an indirect rotatable connection to the rotatable joint 413-2 such as with one or more gears, or a lever arm coupled to the rotatable joint 413-2. Further, the actuator 423-2 may include a geared or screw actuator that is configured to rotate the adjustable motor fairing 403-2 relative to the motor 401-2 and/or respective motor arm, e.g., via one or more gears coupled to the rotatable joint 413-2 and driven by a rotary or linear actuator. Moreover, the actuator 423-2 may include a magnetic, piezoelectric, or other type of actuator that is configured to rotate the adjustable motor fairing 403-2 relative to the motor 401-2 and/or respective motor arm. Furthermore, the actuator 423-2 may comprise combinations of various types of actuators.

Although FIGS. 4A and 4B illustrate particular configurations of adjustable motor fairings and corresponding rotatable joints, various other types of rotatable joints may be included in adjustable motor fairings to facilitate movement and/or rotation of the adjustable motor fairings. For example, the rotatable joints may comprise gimbal mechanisms, telescoping mechanisms, multi-bar linkage mechanisms, sliding joints, swivel joints, universal joints, other types of movable or rotatable joints, or combinations thereof.

Figure 5A:
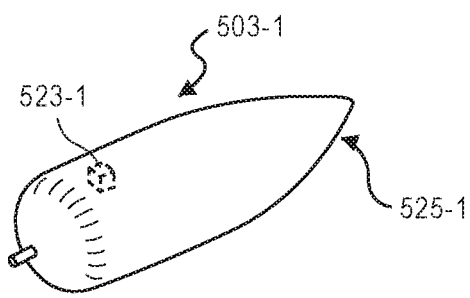
FIG. 5A illustrates a perspective view of an example adjustable motor fairing having a first shape, in accordance with disclosed implementations.
Figure 5B:
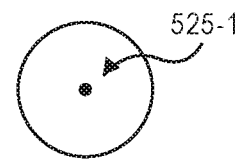
FIG. 5B illustrates a rear view of the example adjustable motor fairing having the first shape as shown in FIG. 5A, in accordance with disclosed implementations.

FIG. 5A illustrates a perspective view of an example adjustable motor fairing 503-1 having a first shape, in accordance with disclosed implementations. FIG. 5B illustrates a rear view of the example adjustable motor fairing 503-1 having the first shape as shown in FIG. 5A, in accordance with disclosed implementations.

As shown in FIGS. 5A and 5B, the adjustable motor fairing 503-1 may be coupled to a motor or propulsion mechanism and/or may be coupled to a motor arm to which the motor or propulsion mechanism is coupled. In addition, the adjustable motor fairing 503-1 may at least partially surround the motor or propulsion mechanism and/or may at least partially surround a motor arm to which the motor or propulsion mechanism is coupled, e.g., for aerodynamic purposes, to provide clearance for relative movement and/or rotation, for noise management, for safety reasons, and/or for other reasons.

The adjustable motor fairing 503-1 may have any of various shapes, including a teardrop or waterdrop shape, an axisymmetric shape, an elliptical shape, or various other aerodynamic shapes that may reduce aerodynamic drag. As shown in FIGS. 5A and 5B, the adjustable motor fairing 503-1 may have an axisymmetric teardrop shape, including a leading surface having a substantially spherical, dome, or other aerodynamic shape and a trailing surface 525-1 having a tapered end, tip, or point. In addition, a shaft that is rotated by the motor is illustrated as extending out of the leading surface of the adjustable motor fairing 503-1, and a propeller may be coupled to and rotated by the shaft.

In example embodiments, the adjustable motor fairing 503-1 may be passively movably coupled to the motor and/or respective motor arm via one or more rotatable joints. In this manner, the adjustable motor fairing 503-1 may move and/or rotate based at least in part on airflow around the adjustable motor fairing 503-1, thereby reducing aerodynamic drag of an aerial vehicle comprising the adjustable motor fairing 503-1.

In other example embodiments, an actuator 523-1 may be associated with the adjustable motor fairing 503-1 and configured to actively move or rotate the adjustable motor fairing 503-1 via one or more rotatable joints. For example, the actuator 523-1 may be a servo, solenoid, rotary actuator, linear actuator, geared actuator, screw actuator, magnetic actuator, piezoelectric actuator, or other type of actuator configured to move or rotate the adjustable motor fairing 503-1, thereby reducing aerodynamic drag and/or applying moments or forces to modify flight characteristics of an aerial vehicle comprising the adjustable motor fairing 503-1.

In example embodiments, the actuator 523-1 may include a servo that is configured to rotate the adjustable motor fairing 503-1 relative to the motor and/or respective motor arm, e.g., via a direct rotatable connection at the rotatable joint, an indirect rotatable connection to the rotatable joint such as with one or more gears, or a lever arm coupled to the rotatable joint. In addition, the actuator 523-1 may include a solenoid that is configured to rotate the adjustable motor fairing 503-1 relative to the motor and/or respective motor arm, e.g., via an indirect rotatable connection to the rotatable joint such as with one or more gears, or a lever arm coupled to the rotatable joint. Further, the actuator 523-1 may include a geared or screw actuator that is configured to rotate the adjustable motor fairing 503-1 relative to the motor and/or respective motor arm, e.g., via one or more gears coupled to the rotatable joint and driven by a rotary or linear actuator. Moreover, the actuator 523-1 may include a magnetic, piezoelectric, or other type of actuator that is configured to rotate the adjustable motor fairing 503-1 relative to the motor and/or respective motor arm. Furthermore, the actuator 523-1 may comprise combinations of various types of actuators.

Figure 5C:
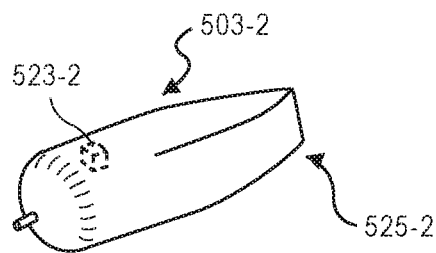
FIG. 5C illustrates a perspective view of an example adjustable motor fairing having a second shape, in accordance with disclosed implementations.
Figure 5D:
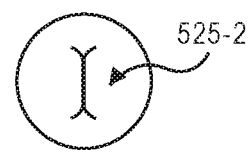
FIG. 5D illustrates a rear view of the example adjustable motor fairing having the second shape as shown in FIG. 5C, in accordance with disclosed implementations.

FIG. 5C illustrates a perspective view of an example adjustable motor fairing 503-2 having a second shape, in accordance with disclosed implementations. FIG. 5D illustrates a rear view of the example adjustable motor fairing 503-2 having the second shape as shown in FIG. 5C, in accordance with disclosed implementations.

As shown in FIGS. 5C and 5D, the adjustable motor fairing 503-2 may be coupled to a motor or propulsion mechanism and/or may be coupled to a motor arm to which the motor or propulsion mechanism is coupled. In addition, the adjustable motor fairing 503-2 may at least partially surround the motor or propulsion mechanism and/or may at least partially surround a motor arm to which the motor or propulsion mechanism is coupled, e.g., for aerodynamic purposes, to provide clearance for relative movement and/or rotation, for noise management, for safety reasons, and/or for other reasons.

The adjustable motor fairing 503-2 may have any of various shapes, including a teardrop or waterdrop shape, an axisymmetric shape, an elliptical shape, or various other aerodynamic shapes that may reduce aerodynamic drag. As shown in FIGS. 5C and 5D, the adjustable motor fairing 503-2 may have an axisymmetric teardrop shape, including a leading surface having a substantially spherical, dome, or other aerodynamic shape and a trailing surface 525-2 that transitions to a polygonal, rectangular, trapezoidal, triangular, or other cross-sectional shape having a tapered end, edge, or line similar to a trailing surface of a wing or airfoil shape. In addition, a shaft that is rotated by the motor is illustrated as extending out of the leading surface of the adjustable motor fairing 503-2, and a propeller may be coupled to and rotated by the shaft.

In example embodiments, the adjustable motor fairing 503-2 may be passively movably coupled to the motor and/or respective motor arm via one or more rotatable joints. In this manner, the adjustable motor fairing 503-2 may move and/or rotate based at least in part on airflow around the adjustable motor fairing 503-2, thereby reducing aerodynamic drag of an aerial vehicle comprising the adjustable motor fairing 503-2.

In other example embodiments, an actuator 523-2 may be associated with the adjustable motor fairing 503-2 and configured to actively move or rotate the adjustable motor fairing 503-2 via one or more rotatable joints. For example, the actuator 523-2 may be a servo, solenoid, rotary actuator, linear actuator, geared actuator, screw actuator, magnetic actuator, piezoelectric actuator, or other type of actuator configured to move or rotate the adjustable motor fairing 503-2, thereby reducing aerodynamic drag and/or applying moments or forces to modify flight characteristics of an aerial vehicle comprising the adjustable motor fairing 503-2.

In example embodiments, the actuator 523-2 may include a servo that is configured to rotate the adjustable motor fairing 503-2 relative to the motor and/or respective motor arm, e.g., via a direct rotatable connection at the rotatable joint, an indirect rotatable connection to the rotatable joint such as with one or more gears, or a lever arm coupled to the rotatable joint. In addition, the actuator 523-2 may include a solenoid that is configured to rotate the adjustable motor fairing 503-2 relative to the motor and/or respective motor arm, e.g., via an indirect rotatable connection to the rotatable joint such as with one or more gears, or a lever arm coupled to the rotatable joint. Further, the actuator 523-2 may include a geared or screw actuator that is configured to rotate the adjustable motor fairing 503-2 relative to the motor and/or respective motor arm, e.g., via one or more gears coupled to the rotatable joint and driven by a rotary or linear actuator. Moreover, the actuator 523-2 may include a magnetic, piezoelectric, or other type of actuator that is configured to rotate the adjustable motor fairing 503-2 relative to the motor and/or respective motor arm. Furthermore, the actuator 523-2 may comprise combinations of various types of actuators.

Figure 5E:
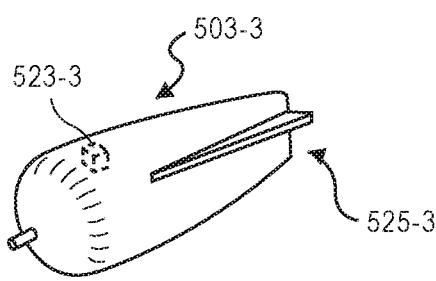
FIG. 5E illustrates a perspective view of an example adjustable motor fairing having a third shape, in accordance with disclosed implementations.
Figure 5F:
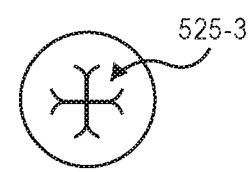
FIG. 5F illustrates a rear view of the example adjustable motor fairing having the third shape as shown in FIG. 5E, in accordance with disclosed implementations.

FIG. 5E illustrates a perspective view of an example adjustable motor fairing 503-3 having a third shape, in accordance with disclosed implementations. FIG. 5F illustrates a rear view of the example adjustable motor fairing 503-3 having the third shape as shown in FIG. 5E, in accordance with disclosed implementations.

As shown in FIGS. 5E and 5F, the adjustable motor fairing 503-3 may be coupled to a motor or propulsion mechanism and/or may be coupled to a motor arm to which the motor or propulsion mechanism is coupled. In addition, the adjustable motor fairing 503-3 may at least partially surround the motor or propulsion mechanism and/or may at least partially surround a motor arm to which the motor or propulsion mechanism is coupled, e.g., for aerodynamic purposes, to provide clearance for relative movement and/or rotation, for noise management, for safety reasons, and/or for other reasons.

The adjustable motor fairing 503-3 may have any of various shapes, including a teardrop or waterdrop shape, an axisymmetric shape, an elliptical shape, or various other aerodynamic shapes that may reduce aerodynamic drag. As shown in FIGS. 5E and 5F, the adjustable motor fairing 503-3 may have an axisymmetric teardrop shape, including a leading surface having a substantially spherical, dome, or other aerodynamic shape and a trailing surface 525-3 having one or more vanes, fins, or similar structures. The one or more vanes, fins, or similar structures may form various shapes, such as a cross shape, star shape, or other shapes, as shown in the rear view of FIG. 5F. In addition, a shaft that is rotated by the motor is illustrated as extending out of the leading surface of the adjustable motor fairing 503-3, and a propeller may be coupled to and rotated by the shaft.

In example embodiments, the adjustable motor fairing 503-3 may be passively movably coupled to the motor and/or respective motor arm via one or more rotatable joints. In this manner, the adjustable motor fairing 503-3 may move and/or rotate based at least in part on airflow around the adjustable motor fairing 503-3, thereby reducing aerodynamic drag of an aerial vehicle comprising the adjustable motor fairing 503-3.

In other example embodiments, an actuator 523-3 may be associated with the adjustable motor fairing 503-3 and configured to actively move or rotate the adjustable motor fairing 503-3 via one or more rotatable joints. For example, the actuator 523-3 may be a servo, solenoid, rotary actuator, linear actuator, geared actuator, screw actuator, magnetic actuator, piezoelectric actuator, or other type of actuator configured to move or rotate the adjustable motor fairing 503-3, thereby reducing aerodynamic drag and/or applying moments or forces to modify flight characteristics of an aerial vehicle comprising the adjustable motor fairing 503-3.

In example embodiments, the actuator 523-3 may include a servo that is configured to rotate the adjustable motor fairing 503-3 relative to the motor and/or respective motor arm, e.g., via a direct rotatable connection at the rotatable joint, an indirect rotatable connection to the rotatable joint such as with one or more gears, or a lever arm coupled to the rotatable joint. In addition, the actuator 523-3 may include a solenoid that is configured to rotate the adjustable motor fairing 503-3 relative to the motor and/or respective motor arm, e.g., via an indirect rotatable connection to the rotatable joint such as with one or more gears, or a lever arm coupled to the rotatable joint. Further, the actuator 523-3 may include a geared or screw actuator that is configured to rotate the adjustable motor fairing 503-3 relative to the motor and/or respective motor arm, e.g., via one or more gears coupled to the rotatable joint and driven by a rotary or linear actuator. Moreover, the actuator 523-3 may include a magnetic, piezoelectric, or other type of actuator that is configured to rotate the adjustable motor fairing 503-3 relative to the motor and/or respective motor arm. Furthermore, the actuator 523-3 may comprise combinations of various types of actuators.

Figure 5G:
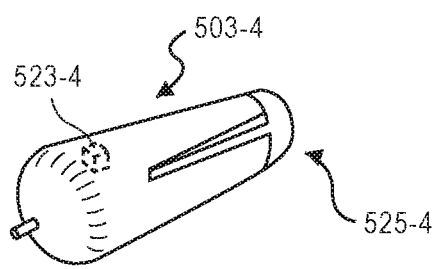
FIG. 5G illustrates a perspective view of an example adjustable motor fairing having a fourth shape, in accordance with disclosed implementations.
Figure 5H:
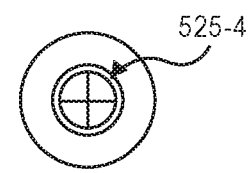
FIG. 5H illustrates a rear view of the example adjustable motor fairing having the fourth shape as shown in FIG. 5G, in accordance with disclosed implementations.

FIG. 5G illustrates a perspective view of an example adjustable motor fairing 503-4 having a fourth shape, in accordance with disclosed implementations. FIG. 5H illustrates a rear view of the example adjustable motor fairing 503-4 having the fourth shape as shown in FIG. 5G, in accordance with disclosed implementations.

As shown in FIGS. 5G and 5H, the adjustable motor fairing 503-4 may be coupled to a motor or propulsion mechanism and/or may be coupled to a motor arm to which the motor or propulsion mechanism is coupled. In addition, the adjustable motor fairing 503-4 may at least partially surround the motor or propulsion mechanism and/or may at least partially surround a motor arm to which the motor or propulsion mechanism is coupled, e.g., for aerodynamic purposes, to provide clearance for relative movement and/or rotation, for noise management, for safety reasons, and/or for other reasons.

The adjustable motor fairing 503-4 may have any of various shapes, including a teardrop or waterdrop shape, an axisymmetric shape, an elliptical shape, or various other aerodynamic shapes that may reduce aerodynamic drag. As shown in FIGS. 5G and 5H, the adjustable motor fairing 503-4 may have an axisymmetric teardrop shape, including a leading surface having a substantially spherical, dome, or other aerodynamic shape and a trailing surface 525-4 having one or more vanes, fins, or similar structures that may be connected via an annular or ring shaped structure. The one or more vanes, fins, or similar structures that may be connected via an annular or ring shaped structure may form various shapes, such as a cross shape, star shape, or other shapes, as shown in the rear view of FIG. 5H. In addition, a shaft that is rotated by the motor is illustrated as extending out of the leading surface of the adjustable motor fairing 503-4, and a propeller may be coupled to and rotated by the shaft.

In example embodiments, the adjustable motor fairing 503-4 may be passively movably coupled to the motor and/or respective motor arm via one or more rotatable joints. In this manner, the adjustable motor fairing 503-4 may move and/or rotate based at least in part on airflow around the adjustable motor fairing 503-4, thereby reducing aerodynamic drag of an aerial vehicle comprising the adjustable motor fairing 503-4.

In other example embodiments, an actuator 523-4 may be associated with the adjustable motor fairing 503-4 and configured to actively move or rotate the adjustable motor fairing 503-4 via one or more rotatable joints. For example, the actuator 523-4 may be a servo, solenoid, rotary actuator, linear actuator, geared actuator, screw actuator, magnetic actuator, piezoelectric actuator, or other type of actuator configured to move or rotate the adjustable motor fairing 503-4, thereby reducing aerodynamic drag and/or applying moments or forces to modify flight characteristics of an aerial vehicle comprising the adjustable motor fairing 503-4.

In example embodiments, the actuator 523-4 may include a servo that is configured to rotate the adjustable motor fairing 503-4 relative to the motor and/or respective motor arm, e.g., via a direct rotatable connection at the rotatable joint, an indirect rotatable connection to the rotatable joint such as with one or more gears, or a lever arm coupled to the rotatable joint. In addition, the actuator 523-4 may include a solenoid that is configured to rotate the adjustable motor fairing 503-4 relative to the motor and/or respective motor arm, e.g., via an indirect rotatable connection to the rotatable joint such as with one or more gears, or a lever arm coupled to the rotatable joint. Further, the actuator 523-4 may include a geared or screw actuator that is configured to rotate the adjustable motor fairing 503-4 relative to the motor and/or respective motor arm, e.g., via one or more gears coupled to the rotatable joint and driven by a rotary or linear actuator. Moreover, the actuator 523-4 may include a magnetic, piezoelectric, or other type of actuator that is configured to rotate the adjustable motor fairing 503-4 relative to the motor and/or respective motor arm. Furthermore, the actuator 523-4 may comprise combinations of various types of actuators.

Figure 5I:
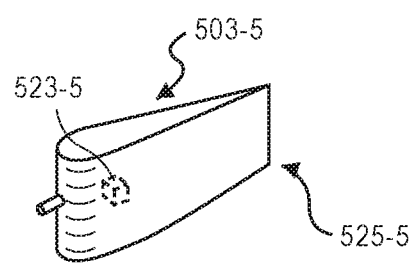
FIG. 5I illustrates a perspective view of an example adjustable motor fairing having a fifth shape, in accordance with disclosed implementations.
Figure 5J:
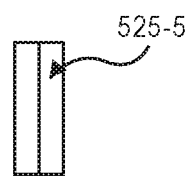
FIG. 5J illustrates a rear view of the example adjustable motor fairing having the fifth shape as shown in FIG. 5I, in accordance with disclosed implementations.

FIG. 5I illustrates a perspective view of an example adjustable motor fairing 503-5 having a fifth shape, in accordance with disclosed implementations. FIG. 5J illustrates a rear view of the example adjustable motor fairing 503-5 having the fifth shape as shown in FIG. 5I, in accordance with disclosed implementations.

As shown in FIGS. 5I and 5J, the adjustable motor fairing 503-5 may be coupled to a motor or propulsion mechanism and/or may be coupled to a motor arm to which the motor or propulsion mechanism is coupled. In addition, the adjustable motor fairing 503-5 may at least partially surround the motor or propulsion mechanism and/or may at least partially surround a motor arm to which the motor or propulsion mechanism is coupled, e.g., for aerodynamic purposes, to provide clearance for relative movement and/or rotation, for noise management, for safety reasons, and/or for other reasons.

The adjustable motor fairing 503-5 may have any of various shapes, including a teardrop or waterdrop shape, an axisymmetric shape, an elliptical shape, or various other aerodynamic shapes that may reduce aerodynamic drag. As shown in FIGS. 5I and 5J, the adjustable motor fairing 503-5 may have a wing or airfoil shape, including a leading end, edge, line, or surface having a substantially rounded, circular, elliptical, or other aerodynamic shape and a trailing surface 525-5 having a tapered end, edge, line, or surface similar to a trailing surface of a wing or airfoil shape. In addition, a shaft that is rotated by the motor is illustrated as extending out of the leading surface of the adjustable motor fairing 503-5, and a propeller may be coupled to and rotated by the shaft.

In example embodiments, the adjustable motor fairing 503-5 may be passively movably coupled to the motor and/or respective motor arm via one or more rotatable joints. In this manner, the adjustable motor fairing 503-5 may move and/or rotate based at least in part on airflow around the adjustable motor fairing 503-5, thereby reducing aerodynamic drag of an aerial vehicle comprising the adjustable motor fairing 503-5.

In other example embodiments, an actuator 523-5 may be associated with the adjustable motor fairing 503-5 and configured to actively move or rotate the adjustable motor fairing 503-5 via one or more rotatable joints. For example, the actuator 523-5 may be a servo, solenoid, rotary actuator, linear actuator, geared actuator, screw actuator, magnetic actuator, piezoelectric actuator, or other type of actuator configured to move or rotate the adjustable motor fairing 503-5, thereby reducing aerodynamic drag and/or applying moments or forces to modify flight characteristics of an aerial vehicle comprising the adjustable motor fairing 503-5.

In example embodiments, the actuator 523-5 may include a servo that is configured to rotate the adjustable motor fairing 503-5 relative to the motor and/or respective motor arm, e.g., via a direct rotatable connection at the rotatable joint, an indirect rotatable connection to the rotatable joint such as with one or more gears, or a lever arm coupled to the rotatable joint. In addition, the actuator 523-5 may include a solenoid that is configured to rotate the adjustable motor fairing 503-5 relative to the motor and/or respective motor arm, e.g., via an indirect rotatable connection to the rotatable joint such as with one or more gears, or a lever arm coupled to the rotatable joint. Further, the actuator 523-5 may include a geared or screw actuator that is configured to rotate the adjustable motor fairing 503-5 relative to the motor and/or respective motor arm, e.g., via one or more gears coupled to the rotatable joint and driven by a rotary or linear actuator. Moreover, the actuator 523-5 may include a magnetic, piezoelectric, or other type of actuator that is configured to rotate the adjustable motor fairing 503-5 relative to the motor and/or respective motor arm. Furthermore, the actuator 523-5 may comprise combinations of various types of actuators.

Although FIGS. 5A-5J illustrate particular shapes or configurations of adjustable motor fairings, various other shapes or configurations of adjustable motor fairings may also be used. For example, the adjustable motor fairings may have other shapes, such as circular, cylindrical, polygonal, regular, or irregular shapes. In addition, the adjustable motor fairings may include other numbers, combinations, or arrangements of vanes, fins, tails, or other edge or surface features.

Figure 6A:
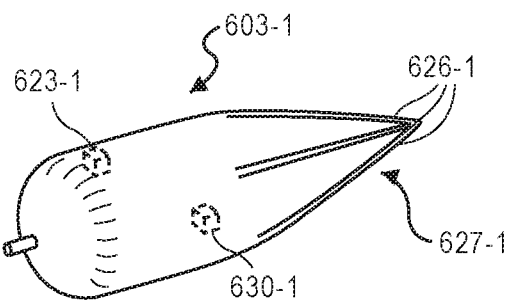
FIG. 6A illustrates a perspective view of an example adjustable motor fairing having first actuatable elements in a retracted position, in accordance with disclosed implementations.
Figure 6B:
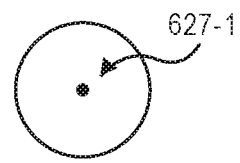
FIG. 6B illustrates a rear view of the example adjustable motor fairing having the first actuatable elements in the retracted position as shown in FIG. 6A, in accordance with disclosed implementations.
Figure 6C:
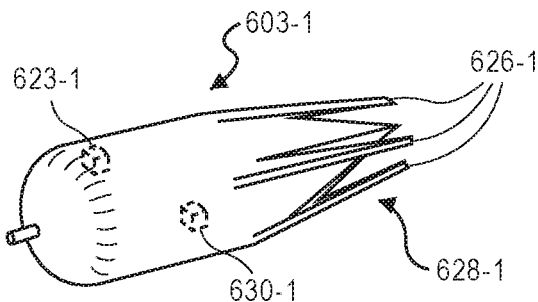
FIG. 6C illustrates a perspective view of the example adjustable motor fairing having the first actuatable elements as shown in FIG. 6A in an extended position, in accordance with disclosed implementations.
Figure 6D:
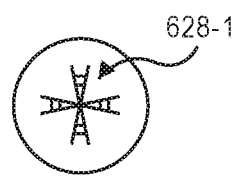
FIG. 6D illustrates a rear view of the example adjustable motor fairing having the first actuatable elements in the extended position as shown in FIG. 6C, in accordance with disclosed implementations.

FIG. 6A illustrates a perspective view of an example adjustable motor fairing 603-1 having first actuatable elements in a retracted position, in accordance with disclosed implementations. FIG. 6B illustrates a rear view of the example adjustable motor fairing 603-1 having the first actuatable elements in the retracted position as shown in FIG. 6A, in accordance with disclosed implementations. FIG. 6C illustrates a perspective view of the example adjustable motor fairing 603-1 having the first actuatable elements as shown in FIG. 6A in an extended position, in accordance with disclosed implementations. FIG. 6D illustrates a rear view of the example adjustable motor fairing 603-1 having the first actuatable elements in the extended position as shown in FIG. 6C, in accordance with disclosed implementations.

As shown in FIGS. 6A-6D, the adjustable motor fairing 603-1 may be coupled to a motor or propulsion mechanism and/or may be coupled to a motor arm to which the motor or propulsion mechanism is coupled. In addition, the adjustable motor fairing 603-1 may at least partially surround the motor or propulsion mechanism and/or may at least partially surround a motor arm to which the motor or propulsion mechanism is coupled, e.g., for aerodynamic purposes, to provide clearance for relative movement and/or rotation, for noise management, for safety reasons, and/or for other reasons.

The adjustable motor fairing 603-1 may have any of various shapes, including a teardrop or waterdrop shape, an axisymmetric shape, an elliptical shape, or various other aerodynamic shapes that may reduce aerodynamic drag. In addition, the adjustable motor fairing 603-1 may include one or more first actuatable elements 626-1, such as vanes, fins, tabs, tails, or other control surfaces. As shown in FIGS. 6A and 6B, the adjustable motor fairing 603-1 may have an axisymmetric teardrop shape, including a leading surface having a substantially spherical, dome, or other aerodynamic shape. Further, when the one or more first actuatable elements 626-1, such as vanes or fins, are in a retracted position, the trailing surface 627-1 may form a tapered end, tip, or point, as shown in the rear view of FIG. 6B. Moreover, as shown in FIGS. 6C and 6D, when the one or more first actuatable elements 626-1, such as vanes or fins, are in an extended position, the trailing surface 628-1 may form various shapes, such as a cross shape, star shape, or other shapes, as shown in the rear view of FIG. 6D. In addition, a shaft that is rotated by the motor is illustrated as extending out of the leading surface of the adjustable motor fairing 603-1, and a propeller may be coupled to and rotated by the shaft.

In example embodiments, the adjustable motor fairing 603-1 may be passively movably coupled to the motor and/or respective motor arm via one or more rotatable joints. In this manner, the adjustable motor fairing 603-1 may move and/or rotate based at least in part on airflow around the adjustable motor fairing 603-1, thereby reducing aerodynamic drag of an aerial vehicle comprising the adjustable motor fairing 603-1.

In other example embodiments, an actuator 623-1 may be associated with the adjustable motor fairing 603-1 and configured to actively move or rotate the adjustable motor fairing 603-1 via one or more rotatable joints. For example, the actuator 623-1 may be a servo, solenoid, rotary actuator, linear actuator, geared actuator, screw actuator, magnetic actuator, piezoelectric actuator, or other type of actuator configured to move or rotate the adjustable motor fairing 603-1, thereby reducing aerodynamic drag and/or applying moments or forces to modify flight characteristics of an aerial vehicle comprising the adjustable motor fairing 603-1.

In example embodiments, the actuator 623-1 may include a servo that is configured to rotate the adjustable motor fairing 603-1 relative to the motor and/or respective motor arm, e.g., via a direct rotatable connection at the rotatable joint, an indirect rotatable connection to the rotatable joint such as with one or more gears, or a lever arm coupled to the rotatable joint. In addition, the actuator 623-1 may include a solenoid that is configured to rotate the adjustable motor fairing 603-1 relative to the motor and/or respective motor arm, e.g., via an indirect rotatable connection to the rotatable joint such as with one or more gears, or a lever arm coupled to the rotatable joint. Further, the actuator 623-1 may include a geared or screw actuator that is configured to rotate the adjustable motor fairing 603-1 relative to the motor and/or respective motor arm, e.g., via one or more gears coupled to the rotatable joint and driven by a rotary or linear actuator. Moreover, the actuator 623-1 may include a magnetic, piezoelectric, or other type of actuator that is configured to rotate the adjustable motor fairing 603-1 relative to the motor and/or respective motor arm. Furthermore, the actuator 623-1 may comprise combinations of various types of actuators.

In further example embodiments, one or more element actuators 630-1 may be associated with the one or more first actuatable elements 626-1 to move the one or more first actuatable elements 626-1 between a retracted position, an extended position, or various other positions. For example, the one or more element actuators 630-1 may be a servo, solenoid, rotary actuator, linear actuator, geared actuator, screw actuator, magnetic actuator, piezoelectric actuator, or other type of actuator configured to change a shape of an outer surface of the adjustable motor fairing 603-1 via the one or more first actuatable elements 626-1, thereby reducing aerodynamic drag and/or applying moments or forces to modify flight characteristics of an aerial vehicle comprising the adjustable motor fairing 603-1 having the first actuatable elements 626-1.

In example embodiments, the element actuators 630-1 may include a servo that is configured to move, rotate, extend, or retract the first actuatable elements 626-1 relative to the outer surface of the adjustable motor fairing 603-1, e.g., via a direct rotatable connection, an indirect rotatable connection such as with one or more gears, or a lever arm. In addition, the element actuators 630-1 may include a solenoid that is configured to move, rotate, extend, or retract the first actuatable elements 626-1 relative to the outer surface of the adjustable motor fairing 603-1, e.g., via an indirect rotatable connection such as with one or more gears, or a lever arm. Further, the element actuators 630-1 may include a geared or screw actuator that is configured to move, rotate, extend, or retract the first actuatable elements 626-1 relative to the outer surface of the adjustable motor fairing 603-1, e.g., via one or more gears driven by a rotary or linear actuator. Moreover, the element actuators 630-1 may include a magnetic, piezoelectric, or other type of actuator that is configured to move, rotate, extend, or retract the first actuatable elements 626-1 relative to the outer surface of the adjustable motor fairing 603-1. Furthermore, the element actuators 630-1 may comprise combinations of various types of actuators.

Figure 6E:
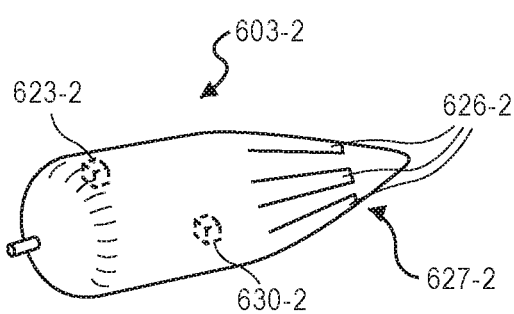
FIG. 6E illustrates a perspective view of an example adjustable motor fairing having second actuatable elements in a retracted position, in accordance with disclosed implementations.
Figure 6F:
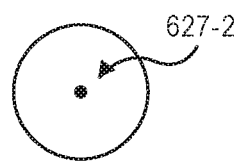
FIG. 6F illustrates a rear view of the example adjustable motor fairing having the second actuatable elements in the retracted position as shown in FIG. 6E, in accordance with disclosed implementations.
Figure 6G:
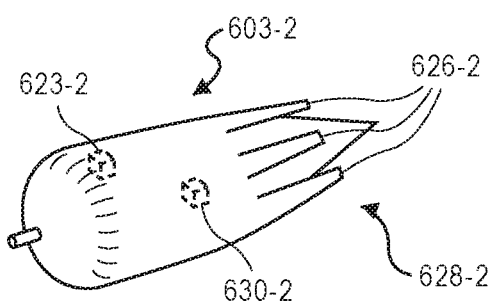
FIG. 6G illustrates a perspective view of the example adjustable motor fairing having the second actuatable elements as shown in FIG. 6E in an extended position, in accordance with disclosed implementations.
Figure 6H:
FIG. 6H illustrates a rear view of the example adjustable motor fairing having the second actuatable elements in the extended position as shown in FIG. 6G, in accordance with disclosed implementations.

FIG. 6E illustrates a perspective view of an example adjustable motor fairing 603-2 having second actuatable elements in a retracted position, in accordance with disclosed implementations. FIG. 6F illustrates a rear view of the example adjustable motor fairing 603-2 having the second actuatable elements in the retracted position as shown in FIG. 6E, in accordance with disclosed implementations. FIG. 6G illustrates a perspective view of the example adjustable motor fairing 603-2 having the second actuatable elements as shown in FIG. 6E in an extended position, in accordance with disclosed implementations. FIG. 6H illustrates a rear view of the example adjustable motor fairing 603-2 having the second actuatable elements in the extended position as shown in FIG. 6G, in accordance with disclosed implementations.

As shown in FIGS. 6E-6H, the adjustable motor fairing 603-2 may be coupled to a motor or propulsion mechanism and/or may be coupled to a motor arm to which the motor or propulsion mechanism is coupled. In addition, the adjustable motor fairing 603-2 may at least partially surround the motor or propulsion mechanism and/or may at least partially surround a motor arm to which the motor or propulsion mechanism is coupled, e.g., for aerodynamic purposes, to provide clearance for relative movement and/or rotation, for noise management, for safety reasons, and/or for other reasons.

The adjustable motor fairing 603-2 may have any of various shapes, including a teardrop or waterdrop shape, an axisymmetric shape, an elliptical shape, or various other aerodynamic shapes that may reduce aerodynamic drag. In addition, the adjustable motor fairing 603-2 may include one or more second actuatable elements 626-2, such as vanes, fins, tabs, tails, or other control surfaces. As shown in FIGS. 6E and 6F, the adjustable motor fairing 603-2 may have an axisymmetric teardrop shape, including a leading surface having a substantially spherical, dome, or other aerodynamic shape. Further, when the one or more second actuatable elements 626-2, such as tabs or control surfaces, are in a retracted position, the trailing surface 627-2 may form a tapered end, tip, or point, as shown in the rear view of FIG. 6F. Moreover, as shown in FIGS. 6G and 6H, when the one or more second actuatable elements 626-2, such as tabs or control surfaces, are in an extended position, the trailing surface 628-2 may form various shapes, such as a cross shape, star shape, or other shapes, as shown in the rear view of FIG. 6H. In addition, a shaft that is rotated by the motor is illustrated as extending out of the leading surface of the adjustable motor fairing 603-2, and a propeller may be coupled to and rotated by the shaft.

In example embodiments, the adjustable motor fairing 603-2 may be passively movably coupled to the motor and/or respective motor arm via one or more rotatable joints. In this manner, the adjustable motor fairing 603-2 may move and/or rotate based at least in part on airflow around the adjustable motor fairing 603-2, thereby reducing aerodynamic drag of an aerial vehicle comprising the adjustable motor fairing 603-2.

In other example embodiments, an actuator 623-2 may be associated with the adjustable motor fairing 603-2 and configured to actively move or rotate the adjustable motor fairing 603-2 via one or more rotatable joints. For example, the actuator 623-2 may be a servo, solenoid, rotary actuator, linear actuator, geared actuator, screw actuator, magnetic actuator, piezoelectric actuator, or other type of actuator configured to move or rotate the adjustable motor fairing 603-2, thereby reducing aerodynamic drag and/or applying moments or forces to modify flight characteristics of an aerial vehicle comprising the adjustable motor fairing 603-2.

In example embodiments, the actuator 623-2 may include a servo that is configured to rotate the adjustable motor fairing 603-2 relative to the motor and/or respective motor arm, e.g., via a direct rotatable connection at the rotatable joint, an indirect rotatable connection to the rotatable joint such as with one or more gears, or a lever arm coupled to the rotatable joint. In addition, the actuator 623-2 may include a solenoid that is configured to rotate the adjustable motor fairing 603-2 relative to the motor and/or respective motor arm, e.g., via an indirect rotatable connection to the rotatable joint such as with one or more gears, or a lever arm coupled to the rotatable joint. Further, the actuator 623-2 may include a geared or screw actuator that is configured to rotate the adjustable motor fairing 603-2 relative to the motor and/or respective motor arm, e.g., via one or more gears coupled to the rotatable joint and driven by a rotary or linear actuator. Moreover, the actuator 623-2 may include a magnetic, piezoelectric, or other type of actuator that is configured to rotate the adjustable motor fairing 603-2 relative to the motor and/or respective motor arm. Furthermore, the actuator 623-2 may comprise combinations of various types of actuators.

In further example embodiments, one or more element actuators 630-2 may be associated with the one or more second actuatable elements 626-2 to move the one or more second actuatable elements 626-2 between a retracted position, an extended position, or various other positions. For example, the one or more element actuators 630-2 may be a servo, solenoid, rotary actuator, linear actuator, geared actuator, screw actuator, magnetic actuator, piezoelectric actuator, or other type of actuator configured to change a shape of an outer surface of the adjustable motor fairing 603-2 via the one or more second actuatable elements 626-2, thereby reducing aerodynamic drag and/or applying moments or forces to modify flight characteristics of an aerial vehicle comprising the adjustable motor fairing 603-2 having the second actuatable elements 626-2.

In example embodiments, the element actuators 630-2 may include a servo that is configured to move, rotate, extend, or retract the second actuatable elements 626-2 relative to the outer surface of the adjustable motor fairing 603-2, e.g., via a direct rotatable connection, an indirect rotatable connection such as with one or more gears, or a lever arm. In addition, the element actuators 630-2 may include a solenoid that is configured to move, rotate, extend, or retract the second actuatable elements 626-2 relative to the outer surface of the adjustable motor fairing 603-2, e.g., via an indirect rotatable connection such as with one or more gears, or a lever arm. Further, the element actuators 630-2 may include a geared or screw actuator that is configured to move, rotate, extend, or retract the second actuatable elements 626-2 relative to the outer surface of the adjustable motor fairing 603-2, e.g., via one or more gears driven by a rotary or linear actuator. Moreover, the element actuators 630-2 may include a magnetic, piezoelectric, or other type of actuator that is configured to move, rotate, extend, or retract the second actuatable elements 626-2 relative to the outer surface of the adjustable motor fairing 603-2. Furthermore, the element actuators 630-2 may comprise combinations of various types of actuators.

FIG. 6I illustrates a perspective view of an example adjustable motor fairing 603-3 having third actuatable elements in a retracted position, in accordance with disclosed implementations. FIG. 6J illustrates a rear view of the example adjustable motor fairing 603-3 having the third actuatable elements in the retracted position as shown in FIG. 6I, in accordance with disclosed implementations. FIG. 6K illustrates a perspective view of the example adjustable motor fairing 603-3 having the third actuatable elements as shown in FIG. 6I in an extended position, in accordance with disclosed implementations. FIG. 6L illustrates a rear view of the example adjustable motor fairing 603-3 having the third actuatable elements in the extended position as shown in FIG. 6K, in accordance with disclosed implementations.

As shown in FIGS. 6I-6L, the adjustable motor fairing 603-3 may be coupled to a motor or propulsion mechanism and/or may be coupled to a motor arm to which the motor or propulsion mechanism is coupled. In addition, the adjustable motor fairing 603-3 may at least partially surround the motor or propulsion mechanism and/or may at least partially surround a motor arm to which the motor or propulsion mechanism is coupled, e.g., for aerodynamic purposes, to provide clearance for relative movement and/or rotation, for noise management, for safety reasons, and/or for other reasons.

The adjustable motor fairing 603-3 may have any of various shapes, including a teardrop or waterdrop shape, an axisymmetric shape, an elliptical shape, or various other aerodynamic shapes that may reduce aerodynamic drag, and the adjustable motor fairing 603-3, including an outer surface thereof, may be formed at least partially of a material that is flexible, expandable, retractable, or otherwise adjustable, such as plastic, rubber, various fibers, or other flexible materials. In addition, the adjustable motor fairing 603-3 may include one or more third actuatable elements 626-3, such as internal movable elements, internal bladders, or other internal actuatable elements that are configured to change a shape of an outer surface of the adjustable motor fairing 603-3. As shown in FIGS. 6I and 6J, the adjustable motor fairing 603-3 may have an axisymmetric teardrop shape, including a leading surface having a substantially spherical, dome, or other aerodynamic shape. Further, when the one or more third actuatable elements 626-3, such as internal movable elements or bladders, are in a retracted or contracted position that does not change a shape of an outer surface, the trailing surface 627-3 may form a tapered end, tip, or point, as shown in the rear view of FIG. 6J. Moreover, as shown in FIGS. 6K and 6L, when the one or more third actuatable elements 626-3, such as internal movable elements or bladders, are in an extended or expanded position that changes a shape of an outer surface, the trailing surface 628-3 may form various shapes, such as a trailing edge or line, cross shape, star shape, or other shapes, as shown in the rear view of FIG. 6L. In addition, a shaft that is rotated by the motor is illustrated as extending out of the leading surface of the adjustable motor fairing 603-3, and a propeller may be coupled to and rotated by the shaft.

In example embodiments, the adjustable motor fairing 603-3 may be passively movably coupled to the motor and/or respective motor arm via one or more rotatable joints. In this manner, the adjustable motor fairing 603-3 may move and/or rotate based at least in part on airflow around the adjustable motor fairing 603-3, thereby reducing aerodynamic drag of an aerial vehicle comprising the adjustable motor fairing 603-3.

In other example embodiments, an actuator 623-3 may be associated with the adjustable motor fairing 603-3 and configured to actively move or rotate the adjustable motor fairing 603-3 via one or more rotatable joints. For example, the actuator 623-3 may be a servo, solenoid, rotary actuator, linear actuator, geared actuator, screw actuator, magnetic actuator, piezoelectric actuator, or other type of actuator configured to move or rotate the adjustable motor fairing 603-3, thereby reducing aerodynamic drag and/or applying moments or forces to modify flight characteristics of an aerial vehicle comprising the adjustable motor fairing 603-3.

In example embodiments, the actuator 623-3 may include a servo that is configured to rotate the adjustable motor fairing 603-3 relative to the motor and/or respective motor arm, e.g., via a direct rotatable connection at the rotatable joint, an indirect rotatable connection to the rotatable joint such as with one or more gears, or a lever arm coupled to the rotatable joint. In addition, the actuator 623-3 may include a solenoid that is configured to rotate the adjustable motor fairing 603-3 relative to the motor and/or respective motor arm, e.g., via an indirect rotatable connection to the rotatable joint such as with one or more gears, or a lever arm coupled to the rotatable joint. Further, the actuator 623-3 may include a geared or screw actuator that is configured to rotate the adjustable motor fairing 603-3 relative to the motor and/or respective motor arm, e.g., via one or more gears coupled to the rotatable joint and driven by a rotary or linear actuator. Moreover, the actuator 623-3 may include a magnetic, piezoelectric, or other type of actuator that is configured to rotate the adjustable motor fairing 603-3 relative to the motor and/or respective motor arm. Furthermore, the actuator 623-3 may comprise combinations of various types of actuators.

In further example embodiments, one or more element actuators 630-3 may be associated with the one or more third actuatable elements 626-3 to move the one or more third actuatable elements 626-3 that are internal to the adjustable motor fairing 603-3 between a retracted or contracted position, an extended or expanded position, or various other positions. For example, the one or more element actuators 630-3 may be a pump, servo, solenoid, rotary actuator, linear actuator, geared actuator, screw actuator, magnetic actuator, piezoelectric actuator, or other type of actuator configured to change a shape of an outer surface of the adjustable motor fairing 603-3 via the one or more internal third actuatable elements 626-3, thereby reducing aerodynamic drag and/or applying moments or forces to modify flight characteristics of an aerial vehicle comprising the adjustable motor fairing 603-3 having the third actuatable elements 626-3.

In example embodiments, the element actuators 630-3 may include a pump that is configured to move, extend, expand, retract, or contract the third actuatable elements 626-3 relative to the outer surface of the adjustable motor fairing 603-3, e.g., via movement, expansion, or retraction of internal bladders or other internal movable elements. Also, the element actuators 630-3 may include a servo that is configured to move, rotate, extend, or retract the third actuatable elements 626-3 relative to the outer surface of the adjustable motor fairing 603-3, e.g., via a direct rotatable connection, an indirect rotatable connection such as with one or more gears, or a lever arm. In addition, the element actuators 630-3 may include a solenoid that is configured to move, rotate, extend, or retract the third actuatable elements 626-3 relative to the outer surface of the adjustable motor fairing 603-3, e.g., via an indirect rotatable connection such as with one or more gears, or a lever arm. Further, the element actuators 630-3 may include a geared or screw actuator that is configured to move, rotate, extend, or retract the third actuatable elements 626-3 relative to the outer surface of the adjustable motor fairing 603-3, e.g., via one or more gears driven by a rotary or linear actuator. Moreover, the element actuators 630-3 may include a magnetic, piezoelectric, or other type of actuator that is configured to move, rotate, extend, or retract the third actuatable elements 626-3 relative to the outer surface of the adjustable motor fairing 603-3. Furthermore, the element actuators 630-3 may comprise combinations of various types of actuators.

Although FIGS. 6A-6L illustrate particular numbers, shapes, configurations, or arrangements of one or more actuatable elements of adjustable motor fairings, various other numbers, shapes, configurations, or arrangements of one or more actuatable elements may be provided to change a shape of an outer surface of adjustable motor fairings. For example, the one or more actuatable elements may include various shapes, such as polygonal, regular, or irregular shapes, may include various combinations of vanes, fins, flaps, tabs, tails, control surfaces, or other elements, and/or may include various combinations of internal and external actuatable elements to change a shape of an outer surface of adjustable motor fairings.

Furthermore, for various example embodiments comprising one or more actuators to change positions, shapes, and/or configurations of one or more adjustable motor fairings and/or one or more actuatable elements associated with adjustable motor fairings, each of the one or more actuators may be operated independently of other actuators, such that the positions, shapes, and/or configurations of a plurality of adjustable motor fairings provided on an aerial vehicle may be changed or controlled independently of each other, and/or may be changed or controlled in coordination with each other to cooperatively reduce aerodynamic drag and/or modify flight characteristics of an aerial vehicle.

Figure 7A:
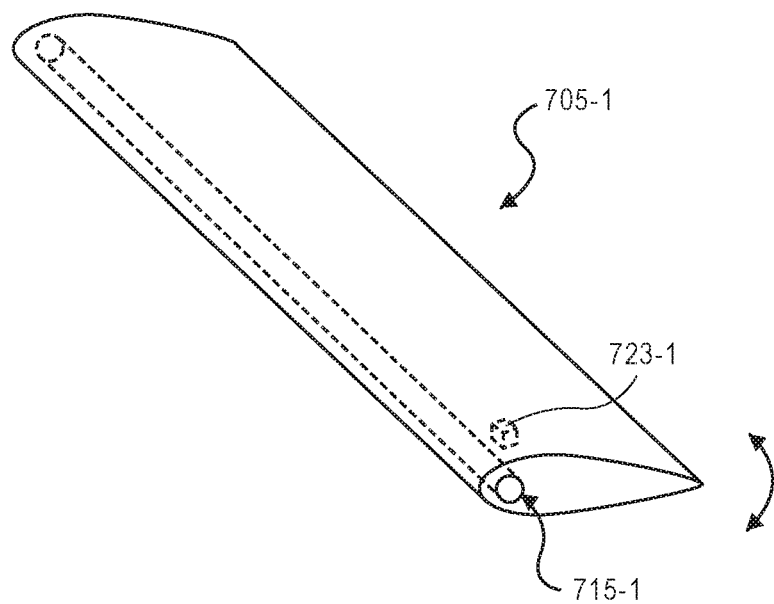
FIG. 7A illustrates a perspective view of a first example adjustable motor arm fairing, in accordance with disclosed implementations.

FIG. 7A illustrates a perspective view of a first example adjustable motor arm fairing 705-1, in accordance with disclosed implementations.

As shown in FIG. 7A, the adjustable motor arm fairing 705-1 may be coupled to a motor arm, strut, or other structural component of an aerial vehicle. In addition, the adjustable motor arm fairing 705-1 may at least partially surround the motor arm, strut, or other structural component, e.g., for aerodynamic purposes, to provide clearance for relative movement and/or rotation, for safety reasons, and/or for other reasons, and the adjustable motor arm fairing 705-1 may extend along substantially an entire length of the respective motor arm, strut, or other structural component.

The adjustable motor arm fairing 705-1 may have any of various shapes, including an airfoil or wing shape, or various other aerodynamic shapes that may reduce aerodynamic drag. As shown in FIG. 7A, the adjustable motor arm fairing 705-1 may have a wing or airfoil shape, including a leading end, edge, line, or surface having a substantially rounded, circular, elliptical, or other aerodynamic shape and a trailing surface having a tapered end, edge, line, or surface similar to a trailing surface of a wing or airfoil shape.

Further, the adjustable motor arm fairing 705-1 may be movable and/or rotatable around an axis defined by a rotatable joint 715-1. The rotatable joint 715-1 and corresponding axis may comprise a pin, rod, shaft, hinge, or other rotatable joint that may enable rotation of the adjustable motor arm fairing 705-1 around the axis. In addition, the rotatable joint 715-1 and corresponding axis may comprise a portion of a motor arm, strut, or other structural component to which the adjustable motor arm fairing 705-1 is movably coupled.

In example embodiments, the adjustable motor arm fairing 705-1 may be passively movably coupled to the motor arm, strut, or other structural component. In this manner, the adjustable motor arm fairing 705-1 may move and/or rotate based at least in part on airflow around the adjustable motor arm fairing 705-1, thereby reducing aerodynamic drag of an aerial vehicle comprising the adjustable motor arm fairing 705-1.

In other example embodiments, an actuator 723-1 may be associated with the adjustable motor arm fairing 705-1 and configured to actively move or rotate the adjustable motor arm fairing 705-1. For example, the actuator 723-1 may be a servo, solenoid, rotary actuator, linear actuator, geared actuator, screw actuator, magnetic actuator, piezoelectric actuator, or other type of actuator configured to move or rotate the adjustable motor arm fairing 705-1, thereby reducing aerodynamic drag and/or applying moments or forces to modify flight characteristics of an aerial vehicle comprising the adjustable motor arm fairing 705-1.

In example embodiments, the actuator 723-1 may include a servo that is configured to rotate the adjustable motor arm fairing 705-1 relative to the motor arm, strut, or other structural component, e.g., via a direct rotatable connection at the rotatable joint 715-1, an indirect rotatable connection to the rotatable joint 715-1 such as with one or more gears, or a lever arm coupled to the rotatable joint 715-1. In addition, the actuator 723-1 may include a solenoid that is configured to rotate the adjustable motor arm fairing 705-1 relative to the motor arm, strut, or other structural component, e.g., via an indirect rotatable connection to the rotatable joint 715-1 such as with one or more gears, or a lever arm coupled to the rotatable joint 715-1. Further, the actuator 723-1 may include a geared or screw actuator that is configured to rotate the adjustable motor arm fairing 705-1 relative to the motor arm, strut, or other structural component, e.g., via one or more gears coupled to the rotatable joint 715-1 and driven by a rotary or linear actuator. Moreover, the actuator 723-1 may include a magnetic, piezoelectric, or other type of actuator that is configured to rotate the adjustable motor arm fairing 705-1 relative to the motor arm, strut, or other structural component. Furthermore, the actuator 723-1 may comprise combinations of various types of actuators.

Figure 7B:
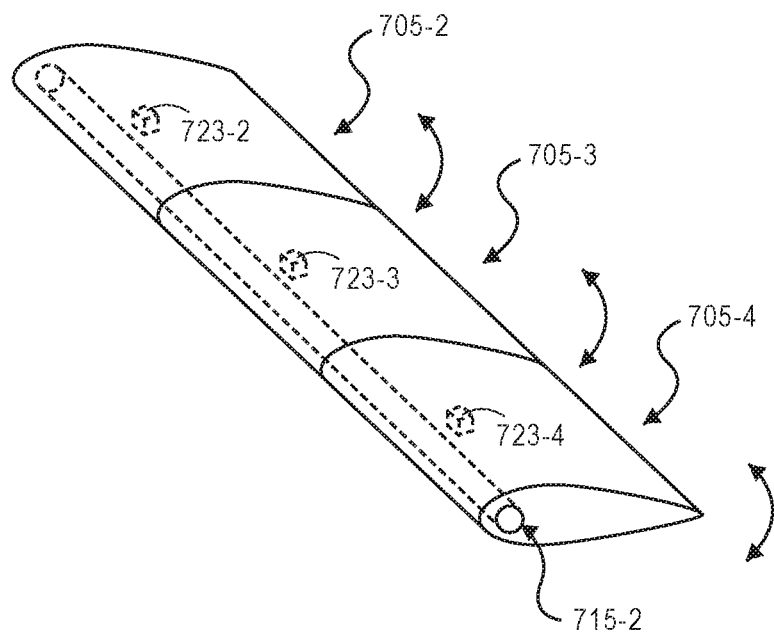
FIG. 7B illustrates a perspective view of other example adjustable motor arm fairings, in accordance with disclosed implementations.

FIG. 7B illustrates a perspective view of other example adjustable motor arm fairings 705-2, 705-3, 705-4, in accordance with disclosed implementations.

As shown in FIG. 7B, the adjustable motor arm fairings 705-2, 705-3, 705-4 may be coupled to a motor arm, strut, or other structural component of an aerial vehicle. In addition, the adjustable motor arm fairings 705-2, 705-3, 705-4 may at least partially surround the motor arm, strut, or other structural component, e.g., for aerodynamic purposes, to provide clearance for relative movement and/or rotation, for safety reasons, and/or for other reasons, and the adjustable motor arm fairings 705-2, 705-3, 705-4 may extend along respective portions of a length of the respective motor arm, strut, or other structural component.

The adjustable motor arm fairings 705-2, 705-3, 705-4 may have any of various shapes, including an airfoil or wing shape, or various other aerodynamic shapes that may reduce aerodynamic drag. As shown in FIG. 7B, the adjustable motor arm fairings 705-2, 705-3, 705-4 may have a wing or airfoil shape, including a leading end, edge, line, or surface having a substantially rounded, circular, elliptical, or other aerodynamic shape and a trailing surface having a tapered end, edge, line, or surface similar to a trailing surface of a wing or airfoil shape.

Further, the adjustable motor arm fairings 705-2, 705-3, 705-4 may be independently movable and/or rotatable around an axis defined by a rotatable joint 715-2. The rotatable joint 715-2 and corresponding axis may comprise a pin, rod, shaft, hinge, or other rotatable joint that may enable rotation of the adjustable motor arm fairings 705-2, 705-3, 705-4 around the axis. In addition, the rotatable joint 715-2 and corresponding axis may comprise a portion of a motor arm, strut, or other structural component to which the adjustable motor arm fairings 705-2, 705-3, 705-4 are independently movably coupled.

In example embodiments, the adjustable motor arm fairings 705-2, 705-3, 705-4 may be passively movably coupled to the motor arm, strut, or other structural component. In this manner, the adjustable motor arm fairings 705-2, 705-3, 705-4 may move and/or rotate independently based at least in part on airflow around the adjustable motor arm fairings 705-2, 705-3, 705-4, thereby reducing aerodynamic drag of an aerial vehicle comprising the adjustable motor arm fairings 705-2, 705-3, 705-4.

In other example embodiments, one or more actuators 723-2, 723-3, 723-4 may be associated with the adjustable motor arm fairings 705-2, 705-3, 705-4 and configured to actively move or rotate the adjustable motor arm fairings 705-2, 705-3, 705-4 independently. For example, the one or more actuators 723-2, 723-3, 723-4 may be a servo, solenoid, rotary actuator, linear actuator, geared actuator, screw actuator, magnetic actuator, piezoelectric actuator, or other type of actuator configured to independently move or rotate the adjustable motor arm fairings 705-2, 705-3, 705-4, thereby reducing aerodynamic drag and/or applying moments or forces to modify flight characteristics of an aerial vehicle comprising the adjustable motor arm fairings 705-2, 705-3, 705-4.

In example embodiments, the actuators 723-2, 723-3, 723-4 may include a servo that is configured to rotate the adjustable motor arm fairings 705-2, 705-3, 705-4 relative to the motor arm, strut, or other structural component, e.g., via a direct rotatable connection at the rotatable joint 715-2, an indirect rotatable connection to the rotatable joint 715-2 such as with one or more gears, or a lever arm coupled to the rotatable joint 715-2. In addition, the actuators 723-2, 723-3, 723-4 may include a solenoid that is configured to rotate the adjustable motor arm fairings 705-2, 705-3, 705-4 relative to the motor arm, strut, or other structural component, e.g., via an indirect rotatable connection to the rotatable joint 715-2 such as with one or more gears, or a lever arm coupled to the rotatable joint 715-2. Further, the actuators 723-2, 723-3, 723-4 may include a geared or screw actuator that is configured to rotate the adjustable motor arm fairings 705-2, 705-3, 705-4 relative to the motor arm, strut, or other structural component, e.g., via one or more gears coupled to the rotatable joint 715-2 and driven by a rotary or linear actuator. Moreover, the actuators 723-2, 723-3, 723-4 may include a magnetic, piezoelectric, or other type of actuator that is configured to rotate the adjustable motor arm fairings 705-2, 705-3, 705-4 relative to the motor arm, strut, or other structural component. Furthermore, the actuators 723-2, 723-3, 723-4 may comprise combinations of various types of actuators.

Although FIGS. 7A and 7B illustrate particular numbers, shapes, configurations, or arrangements of one or more adjustable motor arm fairings, various other numbers, shapes, configurations, or arrangements of one or more adjustable motor arm fairings may be coupled to respective motor arms, struts, or other structural components. For example, the one or more adjustable motor arm fairings may include various shapes, sizes, thicknesses, lengths, spans, other characteristics, or combinations thereof, and/or may include various combinations of one or more actuatable elements, such as vanes, fins, flaps, tabs, tails, control surfaces, or other elements, to change an outer surface of the adjustable motor arm fairings, similar to various actuatable elements configured to cause changes to outer surfaces of adjustable motor fairings described herein with respect to at least FIGS. 6A-6L.

Furthermore, for various example embodiments comprising one or more actuators to change positions, shapes, and/or configurations of one or more adjustable motor arm fairings and/or one or more actuatable elements associated with adjustable motor arm fairings, each of the one or more actuators may be operated independently of other actuators, such that the positions, shapes, and/or configurations of a plurality of adjustable motor arm fairings provided on an aerial vehicle may be changed or controlled independently of each other, and/or may be changed or controlled in coordination with each other to cooperatively reduce aerodynamic drag and/or modify flight characteristics of an aerial vehicle.

Figure 8:
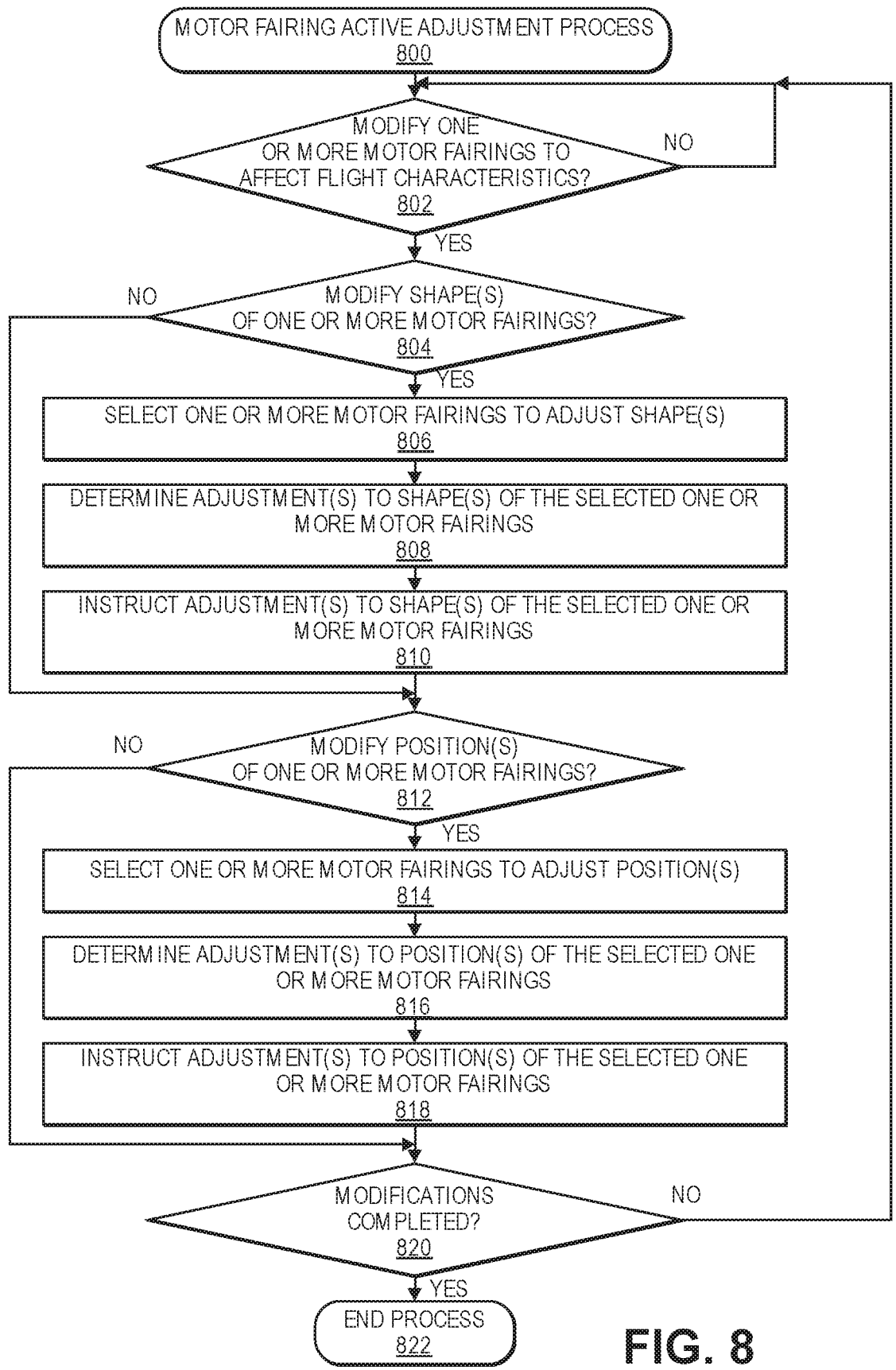
FIG. 8 is a flow diagram illustrating an example motor fairing active adjustment process, in accordance with disclosed implementations.

FIG. 8 is a flow diagram illustrating an example motor fairing active adjustment process 800, in accordance with disclosed implementations.

The process 800 may begin by determining whether to modify one or more motor fairings to affect flight characteristics, as at 802. The one or more motor fairings may include various types and configurations of adjustable motor fairings, as described herein with respect to FIGS. 4A-6L. The one or more motor fairings may be modified to reduce aerodynamic drag, apply moments or forces, affect pitch, yaw, and/or roll, and/or affect other flight characteristics of an aerial vehicle. Further, the process 800 as described herein may also be applied to active adjustment of adjustable motor arm fairings, as described herein with respect to FIGS. 7A and 7B, or various other fairings that may be associated with other components of an aerial vehicle. If it is determined that one or more motor fairings are not to be modified, then the process 800 may return and continue to monitor whether one or more motor fairings is to be modified.

If, however, it is determined that one or more motor fairings is to be modified, then the process 800 may proceed to determine whether shapes of one or more motor fairings is to be modified, as at 804. For example, an outer surface, shape, or configuration of one or more motor fairings may be modified via one or more actuatable elements and corresponding element actuators as described herein, based at least in part on the desired modifications to flight characteristics.

If it is determined that shapes of one or more motor fairings is to be modified, then the process 800 may continue to select one or more motor fairings to adjust shapes, as at 806. For example, an aerial vehicle may include a plurality of motor fairings, e.g., associated with motors, propulsion mechanisms, motor arms, struts, other structural components, or other components, and one or more of the plurality of motor fairings may be selected based at least in part on the desired modifications to flight characteristics.

The process 800 may then proceed to determine adjustments to shapes of the selected one or more motor fairings, as at 808. For example, modifications of one or more actuatable elements via actuations of one or more element actuators associated with the selected one or more motor fairings may be determined to change respective outer surfaces based at least in part on the desired modifications to flight characteristics.

The process 800 may then continue by instructing adjustments to shapes of the selected one or more motor fairings, as at 810. For example, modifications of one or more actuatable elements via actuations of one or more element actuators associated with the selected one or more motor fairings may be instructed to change respective outer surfaces based at least in part on the desired modifications to flight characteristics.

As described herein, the one or more actuatable elements and corresponding element actuators configured to adjust shapes of one or more motor fairings may comprise external elements, internal elements, or combinations thereof. In addition, the one or more actuatable elements may comprise vanes, fins, flaps, tabs, tails, control surfaces, bladders, or other actuatable elements to change an outer surface of a motor fairing. The one or more actuatable elements may extend, protrude, elongate, expand, retract, contract, shorten, shrink, or otherwise modify an outer surface of a motor fairing. Further, the one or more actuatable elements may cause an outer surface of a motor fairing to extend, protrude, elongate, expand, retract, contract, shorten, shrink, or otherwise be modified. Various modifications to an outer surface of a motor fairing may affect one or more flight and/or control characteristics associated with an aerial vehicle.

After modifying the shapes of one or more motor fairings, as at 806, 808, and 810, or if it is determined that shapes of one or more motor fairings is not to be modified, as at 804, then the process 800 may proceed to determine whether positions of one or more motor fairings is to be modified, as at 812. For example, a position of one or more motor fairings may be modified via one or more actuators as described herein, based at least in part on the desired modifications to flight characteristics.

If it is determined that positions of one or more motor fairings is to be modified, then the process 800 may continue to select one or more motor fairings to adjust positions, as at 814. For example, an aerial vehicle may include a plurality of motor fairings, e.g., associated with motors, propulsion mechanisms, motor arms, struts, other structural components, or other components, and one or more of the plurality of motor fairings may be selected based at least in part on the desired modifications to flight characteristics.

The process 800 may then proceed to determine adjustments to positions of the selected one or more motor fairings, as at 816. For example, actuations of one or more actuators associated with the selected one or more motor fairings may be determined to change respective positions based at least in part on the desired modifications to flight characteristics.

The process 800 may then continue by instructing adjustments to positions of the selected one or more motor fairings, as at 818. For example, actuations of one or more actuators associated with the selected one or more motor fairings may be instructed to change respective positions based at least in part on the desired modifications to flight characteristics.

As described herein, the one or more actuators configured to adjust positions of one or more motor fairings may comprise various types of actuators configured to move and/or rotate respective motor fairings relative to respective rotatable joints. In addition, the rotatable joints may comprise pins, rods, shafts, hinges, balls, bearings, spheres, hemispheres, gimbal mechanisms, telescoping mechanisms, multi-bar linkage mechanisms, sliding joints, swivel joints, universal joints, or other rotatable joints to change a position of a motor fairing. Various modifications to a position of a motor fairing may affect one or more flight and/or control characteristics associated with an aerial vehicle.

The process 800 may then proceed by determining whether modifications to shapes, configurations, and/or positions of one or more motor fairings are completed, as at 820. For example, various changes to shapes, configurations, positions, or combinations thereof, of one or more motor fairings associated with an aerial vehicle may be made in order to affect flight characteristics as desired, e.g., to reduce aerodynamic drag, apply moments or forces, affect pitch, yaw, and/or roll, and/or affect other flight characteristics of an aerial vehicle. If it is determined that modifications to one or more motor fairings are not completed, then the process 800 may return to step 802 and determine one or more additional modifications to one or more motor fairings, as described herein.

If, however, it is determined that modifications to one or more motor fairings are completed, then the process 800 may end, as at 822.

Figure 9:
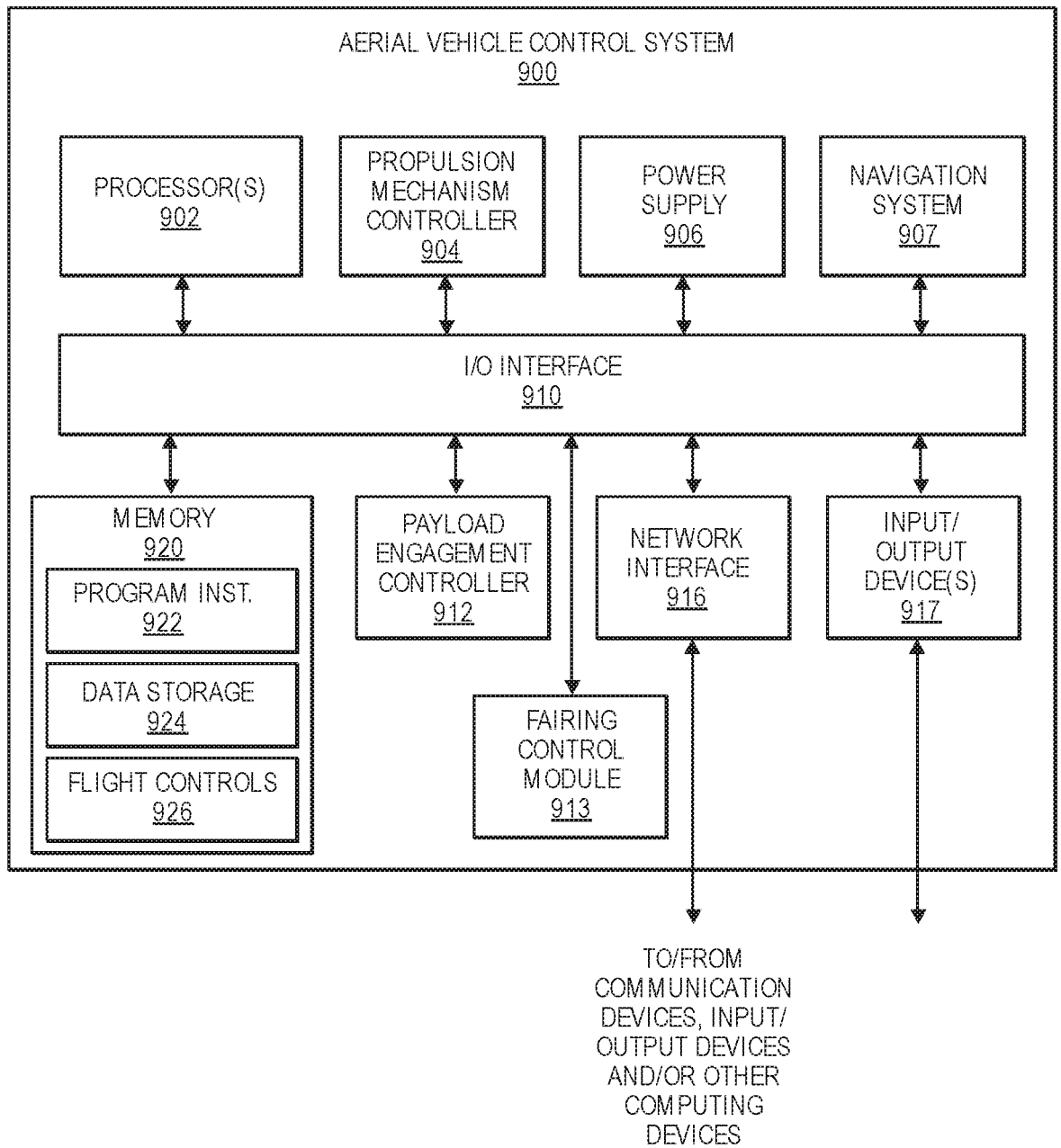
FIG. 9 is a block diagram illustrating various components of an example aerial vehicle control system, in accordance with disclosed implementations.

FIG. 9 is a block diagram illustrating various components of an example aerial vehicle control system 900, in accordance with disclosed implementations. The aerial vehicle control system 214 described with reference to FIG. 2 may include any and all of the features described herein with respect to the example aerial vehicle control system 900.

In various examples, the block diagram may be illustrative of one or more aspects of the aerial vehicle control system 900 that may be used to implement the various systems and methods discussed herein and/or to control operation of an aerial vehicle discussed herein. In the illustrated implementation, the aerial vehicle control system 900 includes one or more processors 902, coupled to a memory, e.g., a non-transitory computer readable storage medium 920, via an input/output (I/O) interface 910. The aerial vehicle control system 900 also includes propulsion mechanism controllers 904, such as electronic speed controls (ESCs) or motor controllers, power modules 906 and/or a navigation system 907. The aerial vehicle control system 900 further includes a payload engagement controller 912, a fairing control module 913 configured to implement changes to positions, shapes, and/or configurations of one or more fairings described herein, a network interface 916, and one or more input/output devices 917.

In various implementations, the aerial vehicle control system 900 may be a uniprocessor system including one processor 902, or a multiprocessor system including several processors 902 (e.g., two, four, eight, or another suitable number). The processor(s) 902 may be any suitable processor capable of executing instructions. For example, in various implementations, the processor(s) 902 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 902 may commonly, but not necessarily, implement the same ISA.

The non-transitory computer readable storage medium 920 may be configured to store executable instructions, data, flight paths, flight control parameters, center of gravity information, and/or data items accessible by the processor(s) 902. In various implementations, the non-transitory computer readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 920 as program instructions 922, data storage 924 and flight controls 926, respectively. In other implementations, program instructions, data, and/or flight controls may be received, sent, or stored upon different types of computer-accessible media, such as non-transitory media, or on similar media separate from the non-transitory computer readable storage medium 920 or the aerial vehicle control system 900. Generally speaking, a non-transitory, computer readable storage medium may include storage media or memory media such as magnetic or optical media, e.g., disk or CD/DVD-ROM, coupled to the aerial vehicle control system 900 via the I/O interface 910. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 916.

In one implementation, the I/O interface 910 may be configured to coordinate I/O traffic between the processor(s) 902, the non-transitory computer readable storage medium 920, and any peripheral devices, the network interface or other peripheral interfaces, such as input/output devices 917. In some implementations, the I/O interface 910 may perform any necessary protocol, timing or other data transformations to convert data signals from one component (e.g., non-transitory computer readable storage medium 920) into a format suitable for use by another component (e.g., processor(s) 902). In some implementations, the I/O interface 910 may include support for devices attached through various types of peripheral buses, such as a variant of the Peripheral Component Interconnect (PCI) bus standard or the Universal Serial Bus (USB) standard, for example. In some implementations, the function of the I/O interface 910 may be split into two or more separate components, such as a north bridge and a south bridge, for example. Also, in some implementations, some or all of the functionality of the I/O interface 910, such as an interface to the non-transitory computer readable storage medium 920, may be incorporated directly into the processor(s) 902.

The propulsion mechanism controllers 904 may communicate with the navigation system 907 and adjust the rotational speed, position, orientation, or other parameters of each propulsion mechanism to control and/or stabilize the aerial vehicle, and/or to perform one or more maneuvers and guide the aerial vehicle along a flight path.

The navigation system 907 may include a global positioning system (GPS), indoor positioning system (IPS), or other similar system and/or sensors that can be used to navigate the aerial vehicle to and/or from a location. The payload engagement controller 912 communicates with the actuator(s) or motor(s) (e.g., a servo motor) used to engage and/or disengage items.

The fairing control module 913 may comprise and/or communicate with one or more actuators and/or actuatable elements that may change positions, shapes, and/or configurations of one or more adjustable motor fairings, as well as other adjustable fairings described herein. For example, adjustable motor fairings may be moved and/or rotated between two or more positions or configurations, e.g., to reduce aerodynamic drag and/or to affect flight characteristics of an aerial vehicle. In addition, adjustable motor fairings may be modified to change one or more portions of their outer surfaces, e.g., to reduce aerodynamic drag and/or to affect flight characteristics of an aerial vehicle. Likewise, adjustable fairings associated with other components of an aerial vehicle, such as motor arms, struts, or other structural components, may also be moved and/or rotated between two or more positions or configurations, e.g., to reduce aerodynamic drag and/or to affect flight characteristics of an aerial vehicle. In some example embodiments, the fairing control module 913 may be integrated with or form a part of one or more of the processors 902, the propulsion mechanism controllers 904, and/or the navigation system 907.

The network interface 916 may be configured to allow data to be exchanged between the aerial vehicle control system 900, other devices attached to a network, such as other computer systems (e.g., remote computing resources), and/or with aerial vehicle control systems of other aerial vehicles. For example, the network interface 916 may enable wireless communication between the aerial vehicle and an aerial vehicle control system that is implemented on one or more remote computing resources. For wireless communication, an antenna of the aerial vehicle or other communication components may be utilized. As another example, the network interface 916 may enable wireless communication between numerous aerial vehicles. In various implementations, the network interface 916 may support communications via wireless general data networks, such as a Wi-Fi network. For example, the network interface 916 may support communication via telecommunications networks, such as cellular communication networks, satellite networks, and the like.

Input/output devices 917 may, in some implementations, include one or more displays, imaging devices, thermal sensors, infrared sensors, time of flight sensors, inertial measurement units, accelerometers, gyroscopes, pressure sensors, weather sensors, etc. Multiple input/output devices 917 may be present and controlled by the aerial vehicle control system 900. One or more of these sensors may be utilized to implement the changes to adjustable fairings described herein, as well as to control flight, navigation, and other operations of the aerial vehicle, including vertical flight configurations, horizontal flight configurations, other flight configurations, transitions between flight configurations, and/or any other flight maneuvers, operations, or functions described herein.

As shown in FIG. 9, the memory may include program instructions 922, which may be configured to implement the example routines and/or sub-routines described herein. The data storage 924 may include various data stores for maintaining data items that may be provided for changing positions of adjustable fairings, changing configurations or shapes of adjustable fairings, reducing aerodynamic drag of one or more components of an aerial vehicle, affecting pitch, yaw, and/or roll of an aerial vehicle, modifying flight characteristics of an aerial vehicle, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 900 is merely illustrative and is not intended to limit the scope of the present disclosure. In particular, the computing system and devices may include any combination of hardware or software that can perform the indicated functions. The aerial vehicle control system 900 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 900. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the aerial vehicle control system 900 may be transmitted to the aerial vehicle control system 900 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and control systems should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

While the above examples have been described with respect to aerial vehicles, the disclosed implementations may also be used for other forms of vehicles, including, but not limited to, ground based vehicles and water based vehicles.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical. Furthermore, as used herein, "horizontal" flight refers to flight traveling in a direction substantially parallel to the ground (e.g., sea level), and that "vertical" flight refers to flight traveling substantially radially outward from or inward toward the earth's center. It should be understood by those having ordinary skill that trajectories may include components of both "horizontal" and "vertical" flight vectors.

Although the invention has been described and illustrated with respect to illustrative implementations thereof, the foregoing and various other additions and omissions may be made therein and thereto without departing from the spirit and scope of the present disclosure.

What is claimed is:

1. An aerial vehicle, comprising:
   a body;
   a plurality of motor arms extending from the body;
   a plurality of motors, each motor coupled to a respective motor arm of the plurality of motor arms;
   a plurality of propellers, each propeller coupled to and rotated by a respective motor of the plurality of motors; and
   a plurality of motor fairings, each motor fairing movably coupled to and completely surrounding a respective motor of the plurality of motors, wherein each motor fairing as a whole is movable relative to a respective motor to which each motor fairing is coupled.

2. The aerial vehicle of claim 1, wherein each motor fairing is rotatable relative to an axis of a respective motor arm to which the respective motor is coupled.

3. The aerial vehicle of claim 1, wherein each motor fairing is rotatable in substantially 360 degrees of rotational freedom relative to the respective motor.

4. The aerial vehicle of claim 1, wherein each motor fairing includes at least one of a vane, a fin, or a tail.

5. A propulsion apparatus, comprising:
   a propulsion mechanism; and
   a fairing movably coupled to and completely surrounding the propulsion mechanism, wherein the fairing as a whole is movable relative to the propulsion mechanism;
   wherein the fairing is movable between at least two positions.

6. The propulsion apparatus of claim 5, wherein the fairing is movably coupled to the propulsion mechanism by a rotatable joint defining an axis of rotation; and
   wherein the fairing is rotatable between the at least two positions relative to the axis of rotation.

7. The propulsion apparatus of claim 5, wherein the fairing is movably coupled to the propulsion mechanism by a spherically rotatable joint; and
   wherein the fairing is rotatable between the at least two positions relative to the spherically rotatable joint.

8. The propulsion apparatus of claim 5, wherein a first position of the at least two positions of the fairing is associated with a vertical flight configuration, and wherein a second position of the at least two positions of the fairing is associated with a horizontal flight configuration.

9. The propulsion apparatus of claim 5, wherein the fairing includes at least one of a vane, a fin, a tail, a flap, or a tab.

10. The propulsion apparatus of claim 5, further comprising:
    an actuator coupled to the fairing and configured to move the fairing between the at least two positions.

11. The propulsion apparatus of claim 10, wherein the actuator is configured to move the fairing to alter an aerodynamic characteristic associated with the propulsion apparatus.

12. The propulsion apparatus of claim 5, further comprising:
    at least one actuatable element associated with an outer surface of the fairing and configured to alter the outer surface of the fairing.

13. The propulsion apparatus of claim 12, wherein the at least one actuatable element includes at least one of a vane, a fin, a tail, a flap, or a tab.

14. The propulsion apparatus of claim 12, wherein the at least one actuatable element is movable between a retracted position substantially flush with the outer surface of the fairing and an extended position at least partially protruding from the outer surface of the fairing.

15. The propulsion apparatus of claim 14, wherein in the retracted position, the at least one actuatable element forms a portion of a tapered end at a trailing surface of the fairing.

16. The propulsion apparatus of claim 14, wherein in the extended position, the at least one actuatable element forms a portion of cross shape at a trailing surface of the fairing.

17. A method to operate an aerial vehicle, comprising:
    instructing adjustment, by an actuator, of a fairing associated with a propulsion mechanism, the fairing movably coupled to and completely surrounding the propulsion mechanism, wherein the fairing as a whole is movable relative to the propulsion mechanism;
    wherein the adjustment of the fairing alters an aerodynamic characteristic associated with the aerial vehicle.

18. The method of claim 17, wherein instructing adjustment of the fairing comprises changing a position of the fairing relative to the aerial vehicle.

19. The method of claim 17, wherein instructing adjustment of the fairing comprises modifying an outer surface of the fairing by at least one actuatable element.

20. The method of claim 19, wherein the at least one actuatable element includes at least one of a vane, a fin, a tail, a flap, or a tab.

* * * * *